United States Patent
Peirce et al.

[11] Patent Number: 6,157,649
[45] Date of Patent: Dec. 5, 2000

[54] METHOD AND SYSTEM FOR COORDINATION AND CONTROL OF DATA STREAMS THAT TERMINATE AT DIFFERENT TERMINATION UNITS USING VIRTUAL TUNNELING

[75] Inventors: Kenneth L. Peirce, Barrington; Patrick Calhoun, Gurnee; Matthew H. Harper, Carol Stream; Daniel L. Schoo, Island Lake; Sumit Vakil, Evanston, all of Ill.

[73] Assignee: 3 Com Corporation, Santa Clara, Calif.

[21] Appl. No.: 08/961,981

[22] Filed: Oct. 31, 1997

Related U.S. Application Data

[63] Continuation-in-part of application No. 08/918,817, Aug. 26, 1997, Pat. No. 5,878,040, which is a continuation of application No. 08/560,314, Nov. 17, 1995, Pat. No. 5,717,690.

[51] Int. Cl.[7] .................. H04J 3/12; H04J 3/24
[52] U.S. Cl. ............ 370/401; 370/410; 370/420; 370/473; 370/474; 370/524
[58] Field of Search ............ 370/352, 389, 370/392, 395, 397, 401, 402, 410, 420, 421, 473, 474, 522, 524, 902, 904; 380/21, 42, 43

[56] References Cited

U.S. PATENT DOCUMENTS

| | | | |
|---|---|---|---|
| 4,996,685 | 2/1991 | Farese et al. | 370/524 |
| 5,208,811 | 5/1993 | Kashio et al. | 370/401 |
| 5,268,904 | 12/1993 | Umeda | 370/421 |
| 5,347,516 | 9/1994 | Yoshida | 370/401 |
| 5,357,504 | 10/1994 | Siegmund | 370/469 |
| 5,519,704 | 5/1996 | Farinacci et al. | 370/401 |
| 5,528,595 | 6/1996 | Walsh et al. | 370/403 |
| 5,577,105 | 11/1996 | Baum et al. | 379/93.01 |
| 5,717,690 | 2/1998 | Peirce . | |
| 5,878,040 | 3/1999 | Peirce . | |

OTHER PUBLICATIONS

Riggs, B.; "ISPs break ISDN promise—Providers fail to offer guaranteed double-channel 128Kbps"; LAN Times; Jun. 23, 1997.
RFC 1717 The PPP Multilink Protocol (MP), K. Sklower, B. Lloyd, G. McGregor, D. Carr, (Nov. 1994).
RFC 1661 The Point-to-Point Protocol, W. Simpson, ed., (Jul., 1994).
MultiLink Protocol Plus (MP+) Protocol Specification, Ascend Communications, Inc. (1995).
Conant, G.; "Multilink PPP: One Big Virtual Wan Pipe", Data Communications, pp. 85–90, Sep. 21, 1995.

*Primary Examiner*—Alpus H. Hsu
*Attorney, Agent, or Firm*—McDonnell, Boehnen, Hulbert, & Berghoff

[57] ABSTRACT

A method for coordinating and controlling multiple data streams representing a data transmission session that terminate in different termination units (such as network access servers) using a virtual data stream tunnel is presented. The data streams are transmitted over two or more links, collectively forming a "bundle." One of the termination units that receives a data stream is designated as the termination unit to receive and reconstruct a call. The designated termination unit is the "owner" of the bundle. A termination unit that is a not a bundle owner creates a virtual tunnel to the termination unit that is the bundle owner, and sends data streams through the virtual tunnel to the bundle owner to reconstruct the call. The designated termination unit reconstructs the data streams for the bundle and directs the bundle to a destination.

30 Claims, 18 Drawing Sheets

FIG. 5B

NUP => This field contains an unsigned long value indicating the number of updates in the packet UT => This field contains the type of update. The valid values for this field are:
 0x01 - New Bundle - packet carries bundle id info.
 0x02 - Sustained Bundle (reset aging timer)
 0x03 - Dropped Bundle - Bundle dropped, delete redirected links.
 0x04 - New Link - New link for bundle - copied from redirection table.
 0x05 - Dropped Link - remove entry from redirection table.

FIG. 7

```
struct redirection_entry {
        sturct redirection_entry*next;
        unsl    mpip_valid;
        unsl    mpip_age;
        unsl    mp_endpoint_type;/*bundle id type*/
        unsl    mp_id_endpoint[20];/*holds actual endpoint */
        unss    mp_mrru;/* */
        unsb    phys_addres[6]; /* cache MAC address */
        unsb    mp_bundle_owner
} RDE;
```

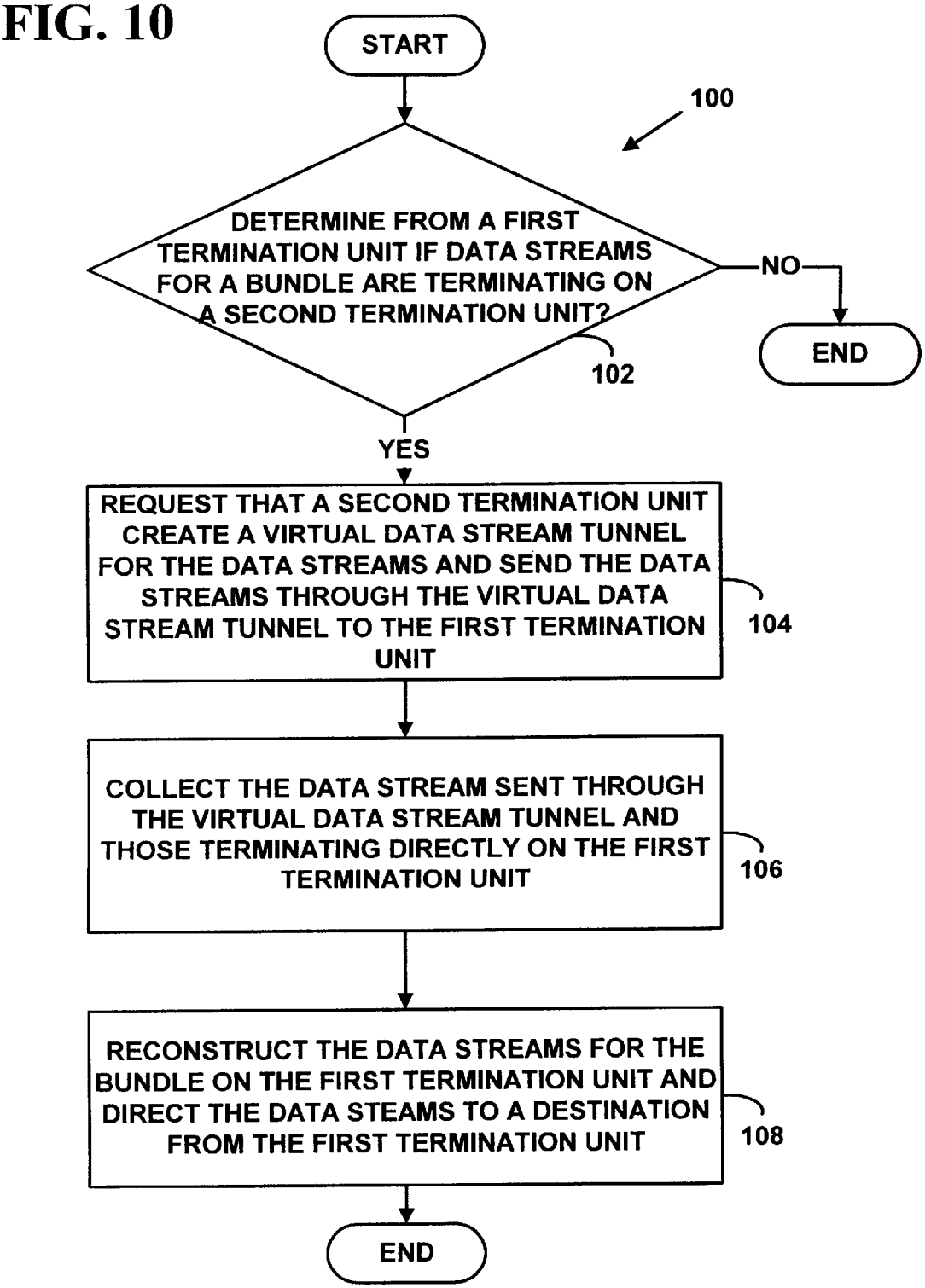

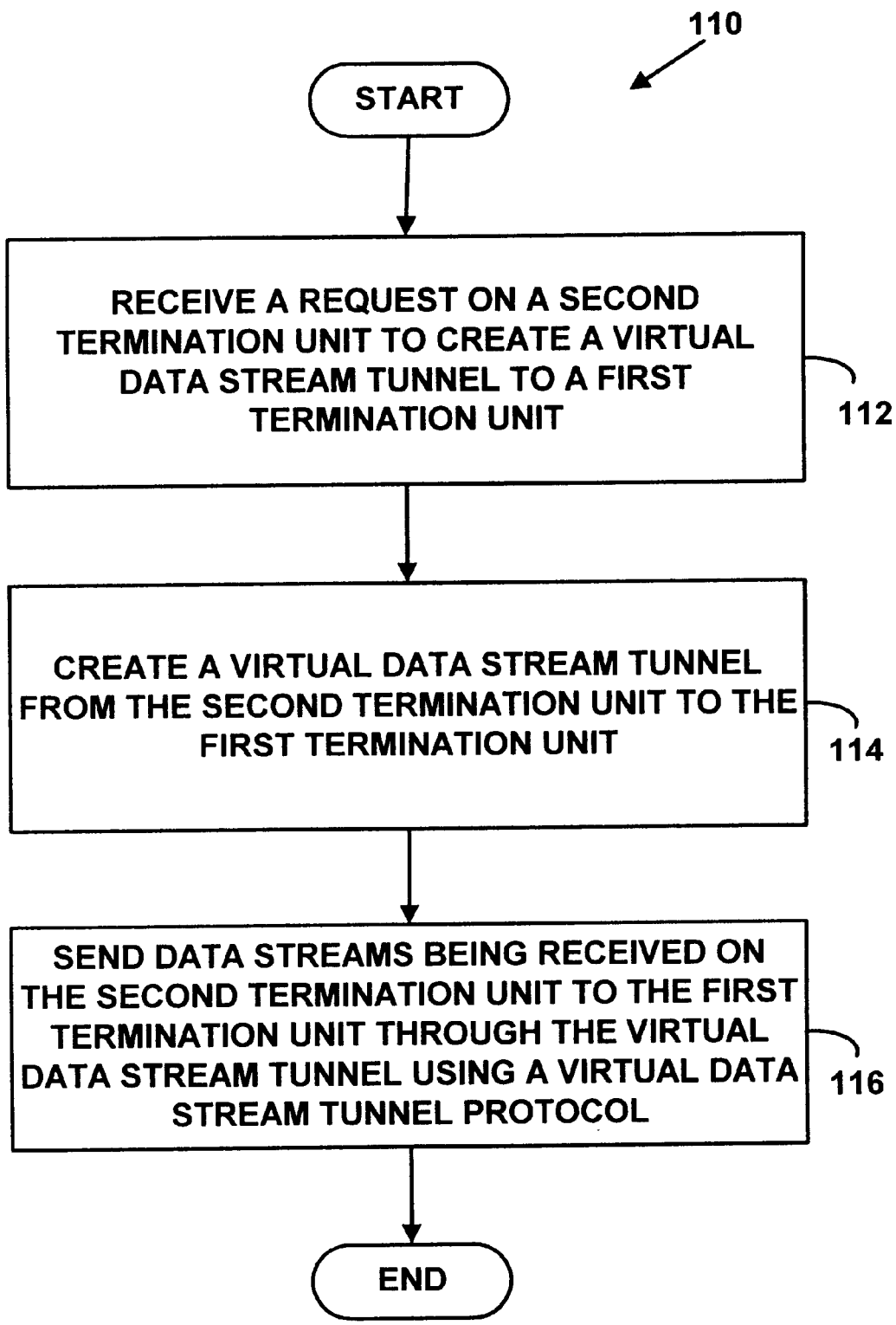

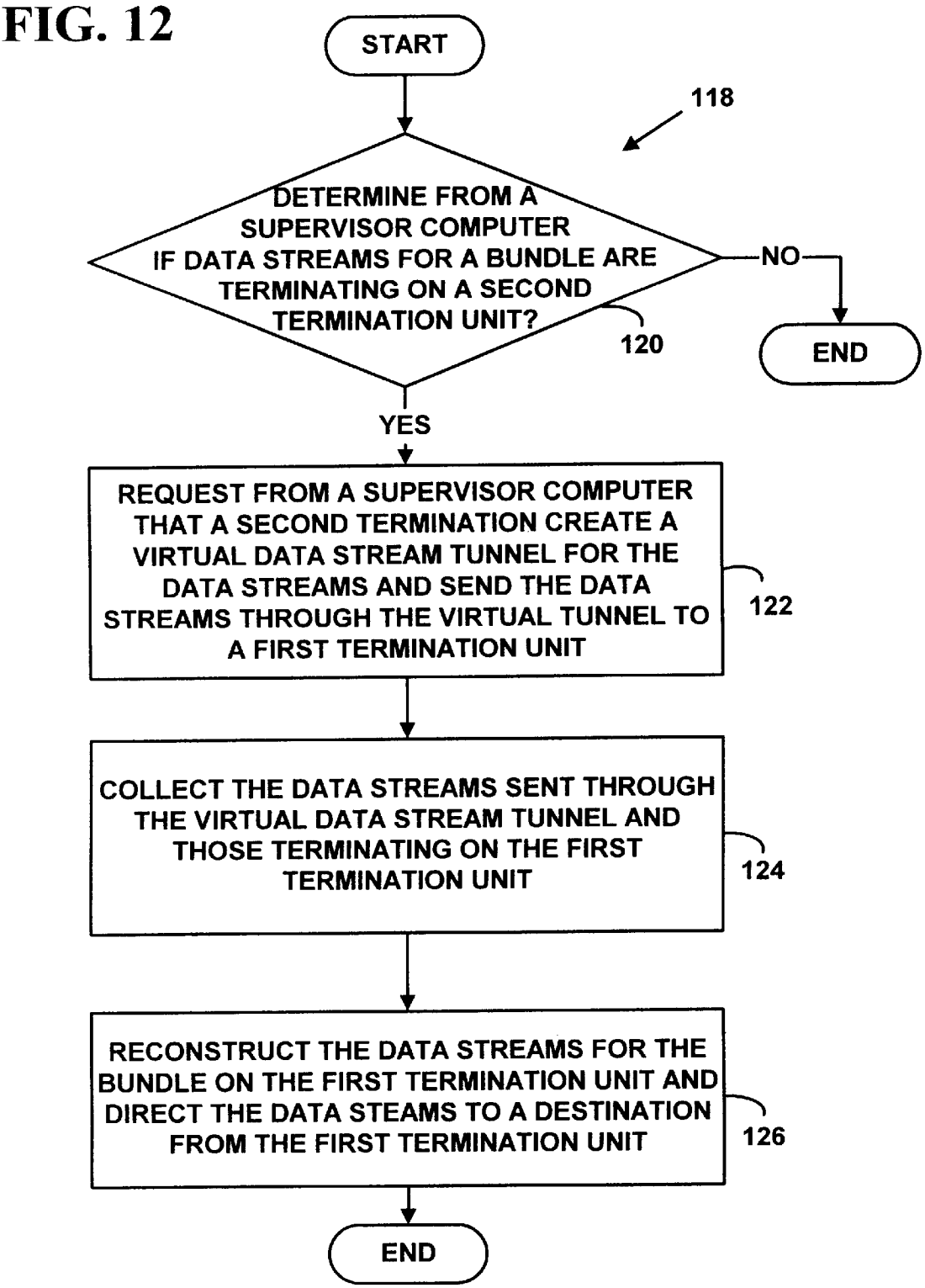

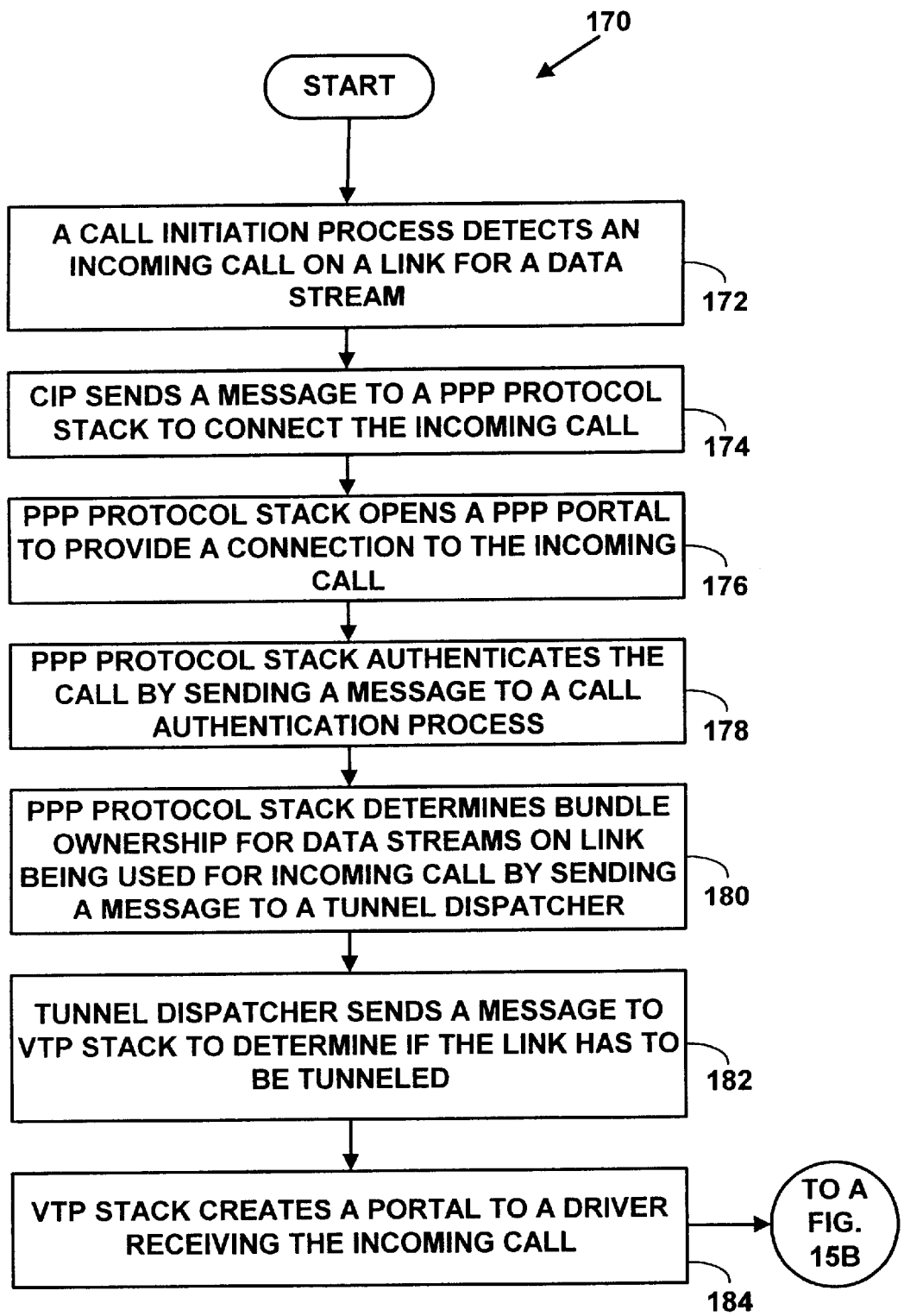

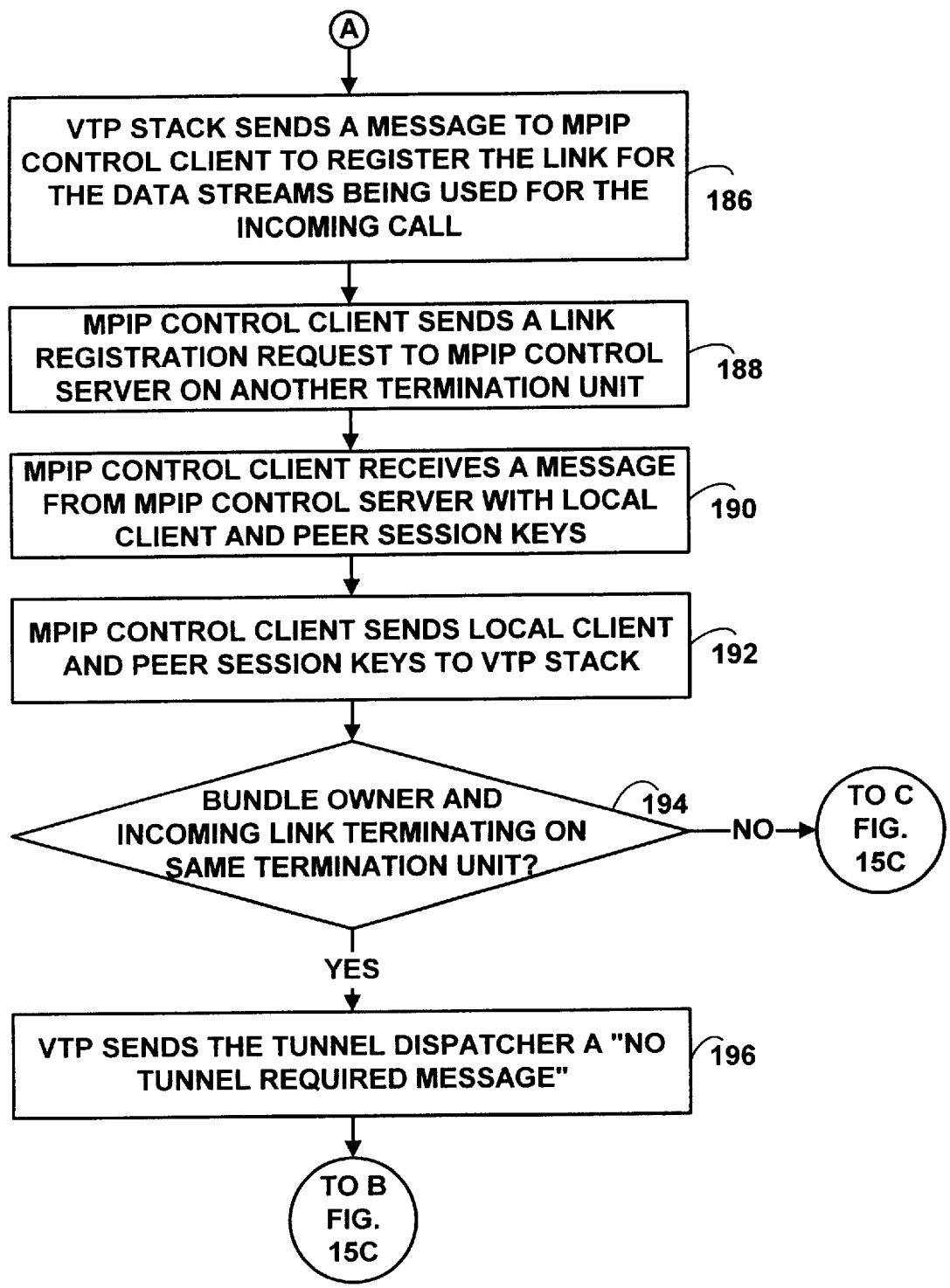

METHOD AND SYSTEM FOR COORDINATION AND CONTROL OF DATA STREAMS THAT TERMINATE AT DIFFERENT TERMINATION UNITS USING VIRTUAL TUNNELING

CROSS REFERENCES TO RELATED APPLICATIONS

This application is a continuation-in-part of application Ser. No. 08/918,817 filed on Aug. 26, 1997, now U.S. Pat. No. 5,878,040, which is a continuation of application Ser. No. 08/560,314 filed on Nov. 17, 1995, now U.S. Pat. No. 5,717,690.

FIELD OF THE INVENTION

This invention relates generally to the field of telecommunications and the processes by which digital data is transmitted between computer systems over a telephone network or other communications link. The invention is particularly suitable for use in devices that support analog telephone services, Integrated Services Digital Network (ISDN) digital telephone services or other communication links with multiple channels.

DESCRIPTION OF RELATED ART

The Point-to-Point Protocol (PPP) provides a standard method of encapsulating network layer protocol information over point-to-point links. PPP also defines an extensible Link Control Protocol (LCP), and proposes a family of Network Control Protocols (NCPs) for establishing and configuring different network-layer protocols. The PPP is described in detail in a series of documents known as the Request For Comments, with which those of skill in the art are familiar. The Request For Comments (RFC) 1661, which is incorporated by reference herein, gives an informative overview of the PPP. The initial deployment of the PPP has been over short local lines, leased lines, and lain-old-telephone-service (POTS) using modems. As new packet services and higher peed lines are introduced, PPP is easily deployed in these environments as well.

The PPP has three main components:

1. A procedure for encapsulating datagrams over serial links;
2. A Link Control Protocol (LCP) for establishing, configuring, and testing the data-link connection; and
3. A family of Network Control Protocols (NCPs) for establishing and configuring different network-layer protocols.

In order to establish communications over a point-to-point link, each end of the PPP link must first send LCP packets to configure the data link during the Link Establishment phase. After the link has been established, PPP provides for an optional Authentication phase before proceeding to the Network-Layer Protocol phase.

PPP encapsulation of data communications is possible when the data is transmitted over digital communication lines, such as ISDN lines. ISDN Basic Rate Service comprises two data channels (referred to as bearer channels or "B" channels), and a control channel known as the "D" channel. The ISDN D-channel can also be used for sending PPP packets when suitably framed, but is limited in bandwidth and often restricts communication links to a local switch. Since the ISDN B-channel is by definition a point-to-point link, PPP is well suited to use over ISDN lines.

The ISDN Primary Rate Interface may support many concurrent B-channel links. The PPP Link Control Protocol and Network Control Protocol mechanisms are particularly useful in this situation in reducing or eliminating hand configuration, and facilitating ease of communication between diverse implementations.

In order to accommodate ISDN data links over multiple channels simultaneously, a protocol known as PPP Multi-Link or MP is used. The PPP MultiLink protocol is described in the Request For Comments 1717, which is incorporated by reference herein. A good discussion of the advantages of PPP Multilink can be found in an article authored by George E. Conant, entitled "Multilink PPP: One Big Virtual WAN Pipe", Data Communications, Sep. 21, 1995. In MP, the data stream, which consists of packets, is split up and inverse-multiplexed onto multiple channels (such as the two ISDN B channels), transmitted through the ISDN network, and then directed to the destination over multiple channels. The term "bundle", as used herein, is intended to mean a collection of links or logical connections that are used for the communication session. In ISDN basic rate service, and where the two bearer channels are used for the session, the two bearer channels comprise a "bundle." At the destination, the data packet stream arriving in separate channels must be reconstituted or reconstructed after transiting the communication channels.

The above circumstance presents a challenge to the design of equipment for running PPP Multilink on a Primary Rate Interface or T1 server at the destination, since the server or termination point is interfacing with a large number of channels of incoming calls, two or more of which may together comprise a bundle. Heretofore, one approach has been that of fixed mapping, i.e., restricting all calls to a single server or gateway card. An alternative approach is time division multiplexing, but this approach has limited flexibility.

The present invention provides for a much more flexible solution. As described below, bundling information is shared between all of the termination units that receive the calls. The present invention provides a method for controlling and coordinating bundles of data streams among multiple termination units, and the reconstitution of the session data at a designated termination unit for transmission of the call to the intended destination using a virtual tunnel.

While the discussion below is primarily directed to an ISDN application, those of skill in the art will appreciate that the invention is applicable to any communication system (e.g., analog, or other digital communications system) in which a session arrives via multiple links at different termination units.

SUMMARY OF THE INVENTION

A method for coordinating and controlling multiple data streams with a virtual data stream tunnel is provided. The multiple data streams represent a session that terminates in different termination units (such as network access servers). A determination is made from a first termination that data streams for a bundle are terminating on a second termination unit. A request is made from the first termination unit that the second termination unit create a virtual data stream tunnel from the second termination unit to the first termination unit and send data streams for the bundle through the virtual data stream tunnel. The data streams from the virtual data stream tunnel and those terminating directly on the first termination unit are collected at the first termination unit. The data streams for the bundle are reconstructed at the first termination unit and directed to a destination. The sharing of bundle information between the termination units through a virtual tunnel gives a great deal of flexibility in the design and type of termination units that may be employed.

While the invention in its simplest form is the coordination of two termination units to handle a session over two channels, the session may take place over an arbitrary number of channels. The sharing of bundle information between a large number of termination units permits the invention to be used in much larger and more sophisticated systems. The flexibility of the present invention is believed to offer a substantial improvement over prior art method of implementing PPP Multilink in a multiple termination unit environment.

BRIEF DESCRIPTION OF THE DRAWINGS

Presently preferred embodiments of the invention are depicted in the drawings, wherein like reference numerals refer to like elements in the various views, and wherein:

FIG. 7 is a software structure that embodies a list element. A bundle mapping table (or Link Redirection Table) is a circularly linked list comprised of the software structure of FIG. 7;

FIG. 10 is a flow diagram illustrating a method for coordinating the reconstruction of multiple data streams for a bundle on a termination unit that includes a MPIP control server;

FIG. 11 is a flow diagram illustrating a method for coordinating the reconstruction of multiple data streams for a bundle on a termination unit that includes a MPIP control client;

FIG. 12 is a flow diagram illustrating a method for coordinating the reconstruction of multiple data streams for a bundle on a supervisor computer that includes a MPIP control server;

FIGS. 15A, 15B and 15C are a flow diagram illustrating a method for establishing a virtual data stream tunnel;

DETAILED DESCRIPTION OF PREFERRED AND ALTERNATIVE EMBODIMENTS OF THE INVENTION

System Overview

Figure 1:
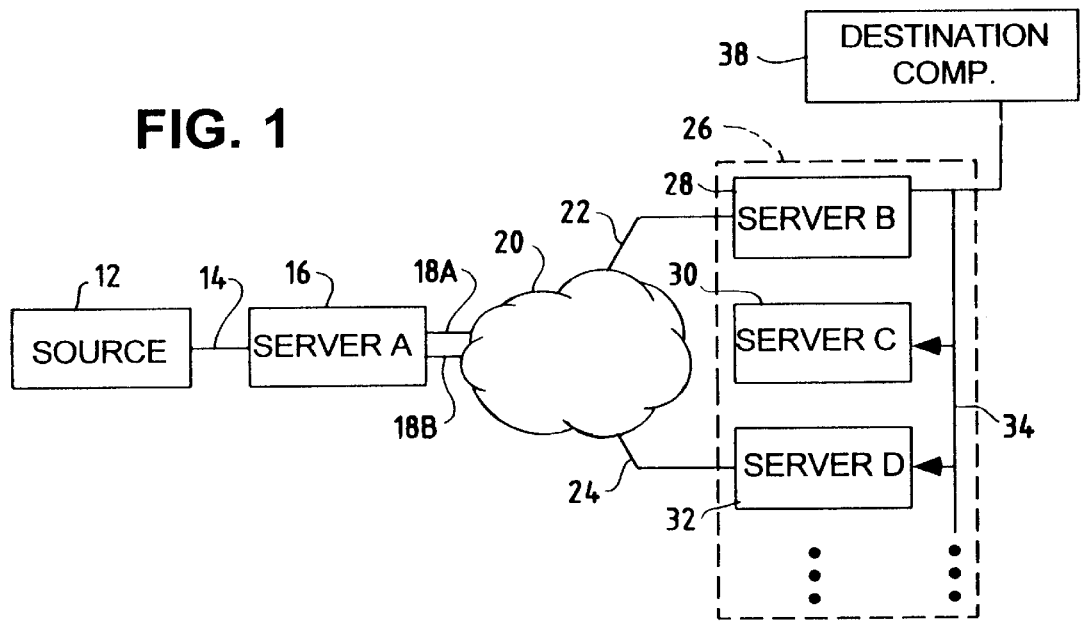
FIG. 1 is an overall block diagram of a system implementing a preferred embodiment of the invention.

Referring to FIG. 1, a representative implementation of the invention is shown diagrammatically in a communication system 10. While the following discussion is based on an ISDN implementation, it will be appreciated that the techniques are applicable to other types of communication systems (such as T-1) and other WAN topologies. The system 10 includes a source of data 12 that is linked to a server A (reference numeral 16) via a network or communication line 14. The server A may be, for example, an ISDN terminal adapter, or an internal PC card in the source 12. The server A has an ISDN basic rate interface providing two bearer channels 18A and 18B for data. The channels 18A and 18B are linked to an ISDN network 20. In the embodiment of FIG. 1, the server 16 supports PPP Multilink protocol. Thus, when the server A laces a call to a destination 26, the data is split over the two bearer channels 18A and 18B and transmitted through the network 20 to a destination call receiving system 26. In his embodiment, an ISDN Primary Rate Interface with PPP Multilink is supported by the destination 26, thus the call may come in on two of the channels 22 and 24 that are part of the ISDN Primary Rate Interfaces that are terminated by receiving system 26.

In the representative embodiment of FIG. 1, the destination 26 is composed of a plurality of termination units for incoming calls, such as a group of network access servers 28, 30 and 32. Any number of additional termination units may be provided. The network access servers 28, 30 and 32 contain a central processing unit ("CPU") and communications interface cards to receive incoming packets of data from the Primary Rate Interface lines 22 and 24. The network access servers 28, 30 and 32 include gateway cards containing suitable hardware and software systems to place the calls on a network 34 for transmission to a destination computer 38. Persons of skill in the art are familiar with network access servers, and such products are available from companies such as U.S. Robotics Access Corp., 8100 N. McCormick Blvd., Skokie, Ill., Livingston Enterprises, Ascend Communications. A network access server is described in U.S. Pat. No. 5,528,595 to Walsh et al. incorporated herein by reference.

The software systems are stored as software instructions in a computer readable medium as multiple data bits. The multiple data bits are maintained on magnetic disks, optical disks, and any other volatile or non-volatile mass storage system readable by a CPU on the termination unit. The computer readable medium includes cooperating or interconnected computer readable media, which exist exclusively on the termination units, or be distributed among multiple interconnected termination units that may be local or remote to the termination units.

It will be appreciated that acts and symbolically represented operations for the data bits include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

As noted above, the data stream representing the call from the source 12 is split up into two data streams that are received at the remote termination units 28 and 32. In accordance with the invention, the termination units 28, 30, 32, etc. are all in communication with each other, such as by a local area network 34. The local area network 34 may be a backplane linking the network access servers 28, 30 and 32 together over a high speed time division multiplexed bus, a Token Ring network, an Ethernet network, a virtual Asynchronous Transport Mode ("ATM") Local Area Network ("LAN") or any other suitable communications medium. The termination units are linked together so as to share bundling information between the termination units that happen to receive the data stream on the lines 22 and 24.

More specifically, when the call from the source is split up in lines 18A and 18B in accordance with PPP Multilink, the data streams will arrive at the destination 26 in lines 22 and 24 at different points in time. According to an illustrative embodiment of the invention, the first termination unit to receive the call, such as termination unit or network access server B, is designated as a receiving termination unit. It has the responsibility of reassembling the data stream and forwarding the data on to the remote computer 38. When it receives the call, the termination unit 28 broadcasts or "advertises" via the local area network 34 that it (unit B) is the designated termination unit. The broadcast is made to the other termination units in the destination 26, such as termination unit 32. If any of the other termination units receive calls from the source 12 or server A (such as termination unit 32) that belong in the bundle comprising the session, the), should transmit the data to the designated termination unit 28. The designation of a termination unit as a termination unit for reconstituting the data stream may be made locally at the destination by a suitable control or operator program, rather than simply being the consequence of being the first termination unit to receive a call in the bundle.

This advertising or broadcasting is done by passing a software structure referred to herein as a "bundle mapping update packet" along the local area network 34. The bundle mapping update packet contains a header field that identifies the particular termination unit that is designated to reconstruct the call.

In the above example, the other termination units (such as units C, D, etc.) are also receiving calls from the other channels in the PRI, and when one of them receives a data stream that is part of the session from the source 12, the other termination unit knows to send its data stream to the receiving termination unit designated as the bundle owner because it will have received a bundle mapping update packet indicating the termination unit that it is the bundle owner. For example, if termination unit 32 also receives a data packet stream from the source, termination unit 32 will have received the broadcast message (i.e., bundle mapping update packet) from unit B alerting it that unit B is the designated termination unit. As the bundle mapping update packet makes its way around the local area network 34, it updates a bundle map software structure resident in the termination units B, C and D, thus keeping all of the termination units up-to-date as to what calls are coming in on the PRI. Preferably, the bundle mapping update packets are circulated frequently around the termination units at the destination 26, such as every 60 to 120 seconds.

Of course, the invention can be implemented in a wide variety of network topologies, and the number and type of termination units will vary depending on the complexity of the system. Gateway cards and network access servers are just two representative examples of what is meant by "termination units". The ability to combine different types of termination units to receive the incoming calls in multiple communication channels gives an enormous amount of flexibility to the system 10, promoting an efficient utilization of PPP Multilink technology.

Figure 2:
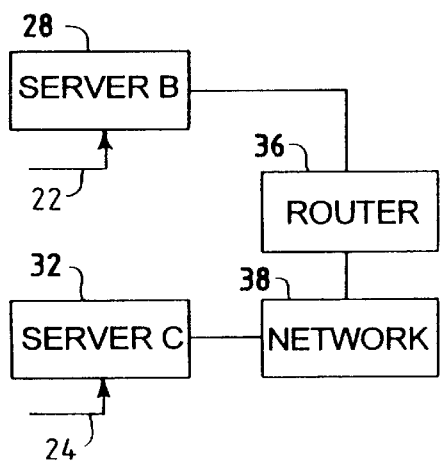
FIG. 2 is block diagram of an alternative embodiment of the invention, showing the linking of two termination units of FIG. 1 via a router and a network.

Referring to FIG. 2, the two termination units 28 and 32 that receive the data packet streams may be linked via a router 36 and a network 38, with the bundling information being shared between the termination units 28 and 32 via the router 36 and network 38.

Figure 3:
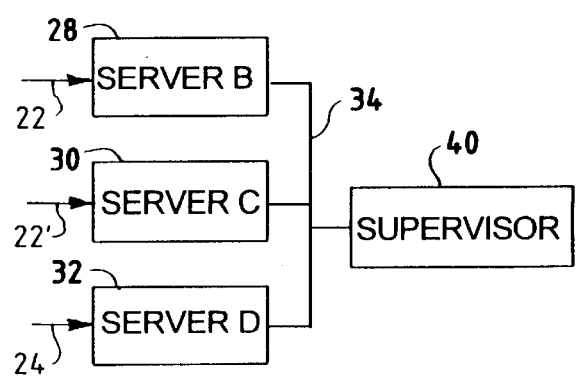
FIG. 3 is a diagram of an alternative embodiment of the invention, wherein a supervisor S exercises control over the broadcasting of bundle mapping update packets and controls the reconstruction of the data stream.

As an alternative configuration, FIG. 3 illustrates how the termination units 28, 30 and 32 may be linked to each other by a network 34, with a supervisor server or computer 40 also on the network 34. The supervisor 40 monitors the sharing of bundling information among the termination units 28, 30 and 32 and directs the processing of the incoming calls among the termination units. Data in separate bundles comes in over channels or lines 22, 22' and 24 from the telephone network.

The embodiments of FIGS. 1–3 illustrate only a few of many possible combinations of termination units, routers, servers, local are networks, in which the invention may be implemented. Persons of skill in the art will readily appreciate that more elaborate arrangements may be designed without departure from the spirit of the invention.

Referring to FIG. 1, the latency (i.e., delay) in routing of the portion of the call received by termination unit 32 to receiving termination unit 28 is an important factor in implementing the invention. The latency should be reduced as much as possible. Having the termination units B, C and D, etc. on a local area network, ATM (Asynchronous Transfer Mode) network or backplane is a preferred embodiment, as this design produces a minimum of latency. The use of a supervisory controller such as supervisor 40 (FIG. 3), or routers, may increase latency and diminish performance of the system.

Sharing of Bundling Information

A protocol has been developed for implementing the invention in a PPP Multilink environment. We have termed this protocol the Multilink Protocol Interspan Protocol (MPIP).

Figure 4:
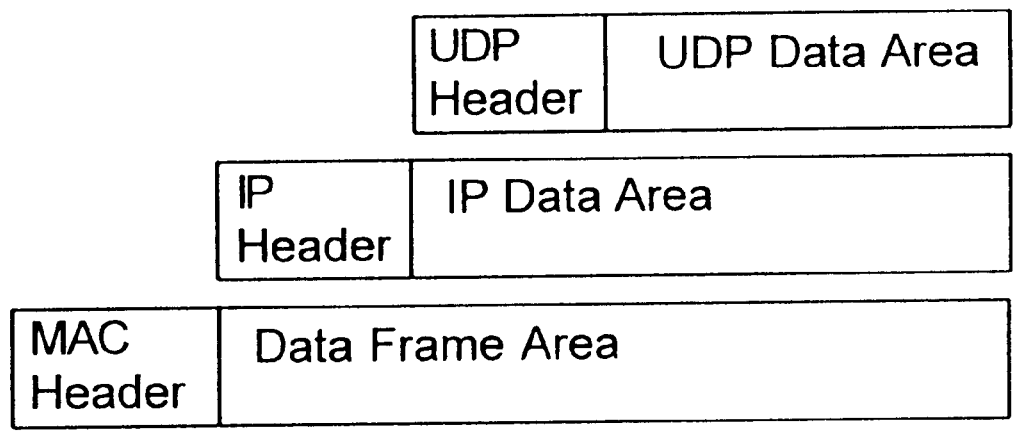
FIG. 4 is a diagram of a protocol structure for implementing the invention in a PPP Multilink environment.
Figure 6:
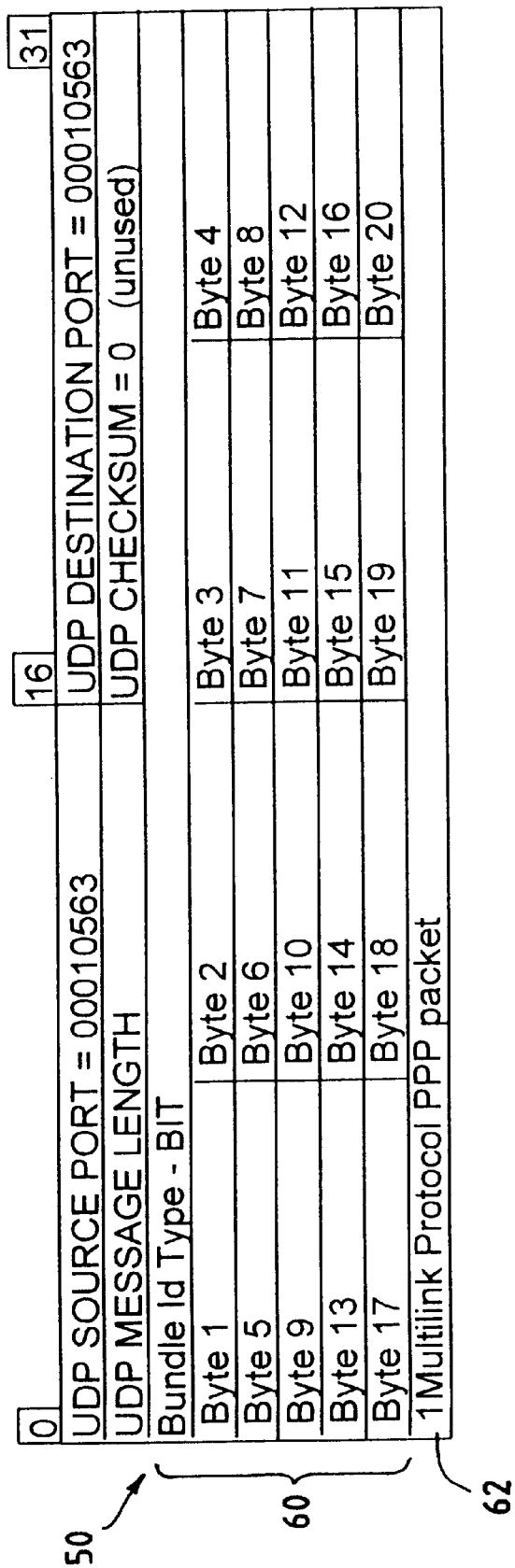
FIG. 6 is an illustration of an MPIP packet according to the invention, the MPIP packet containing a multilink frame of data from the source for transmission to the designated termination unit.

FIG. 4 is a diagram of a protocol structure for implementing the invention in a PPP Multilink environment. A MAC (Medium Access Control) header and Data Frame Area are at the lowest level. Above the lowest level there is an IP (Internet Protocol) header and an IP Data Area. At the top there is a UDP (User Datagram Protocol) header and a UDP Data Area. MPIP packets are used to carry bundle identification headers and 1 Multilink Protocol PPP payload packet. An MPIP packet 50 is shown in FIG. 6. Note the header fields 60 and the Multilink protocol PPP packet 62 form the bulk of the MPIP packet. The Multilink Protocol PPP packet 62 in the MPIP packet 50 contains the data that is transmitted from one termination unit in the destination to the designated receiving termination unit.

Figure 5A:
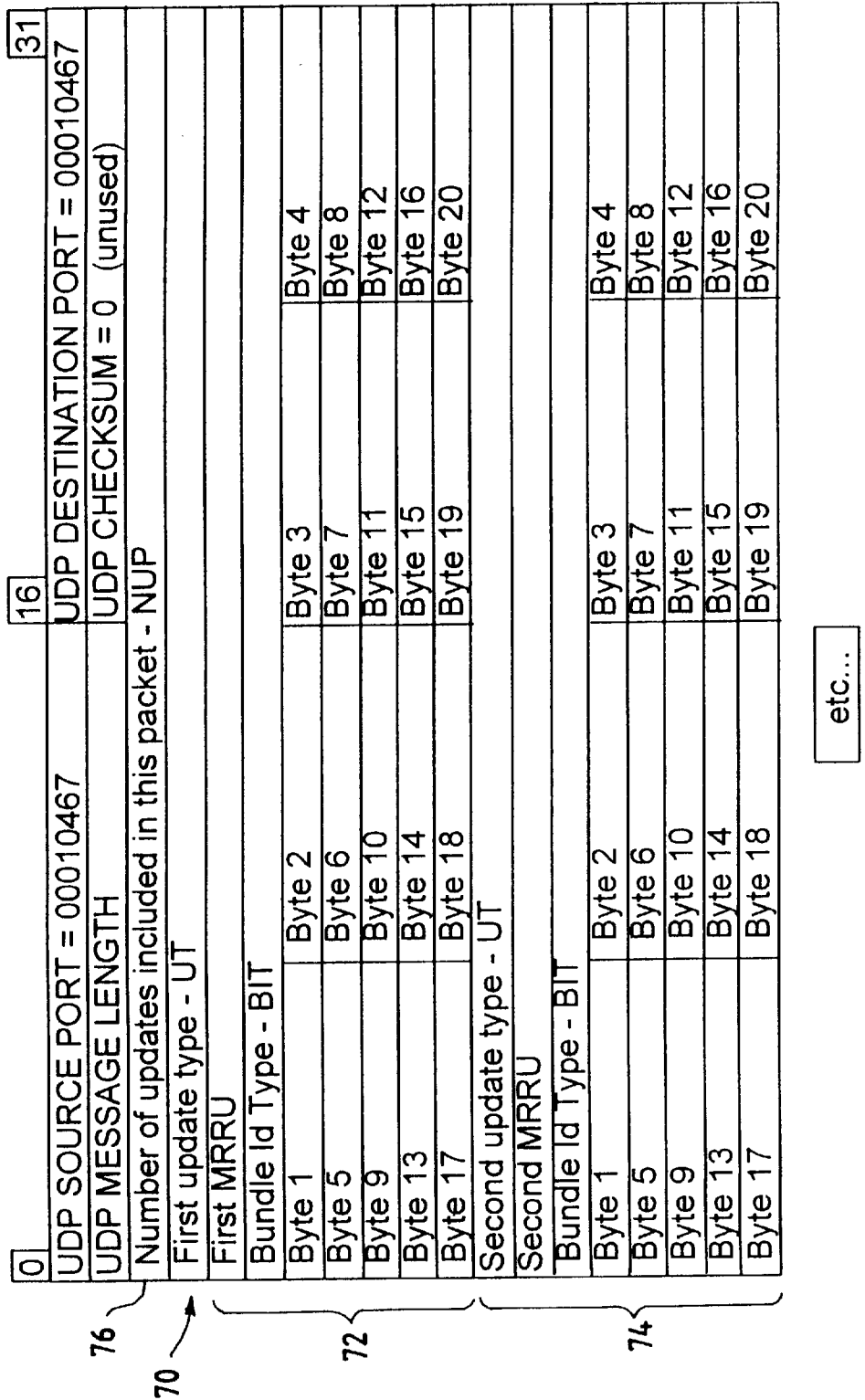
FIG. 5 is an illustration of a bundle mapping updating packet according to a preferred embodiment of the invention, the bundle mapping update packet containing a field identifying the designated termination unit to reconstruct the call at the destination.

The UDP IP packets are used to carry the bundle mapping update packets and MP frames. A bundle mapping update packet 70 is shown in FIG. 5 and is used to update the bundle maps in the termination units. The bundle mapping update packet 70 has an arbitrary number of bundle map update fields 72, 74, etc. The NUP field 76 identifies the number of update fields 72, 74 there are in the packet 70.

The list of entries shown in FIG. 7 are used to hold bundle information from the other termination units at the destination. These list of entries are linked together and circulated around the termination units as a linked list. Entries are created dynamically as there is no way to predict the number of termination units on the local area network 34.

The following rules govern the behavior of a chassis on the local area network 34 for this protocol.

1. Information will be sent out concerning only those bundles that are possessed by the termination units.

2. All the "owned" table (or bundle map) entries will be sent out every 60 seconds over the local area network 34.
3. The IP packet will have a broadcast destination IP and MAC addresses and a time to live of 1.
4. Entries in the table with age out in 120 seconds if not updated via periodic updates from the bundle mapping update packet.
5. When a termination unit receives a bundle advertisement from another termination unit, if it also holds a bundle with the same identification (indicating that the cell came over the two channels from the source 12 at the same time), the two will compare tie breaker values, and the one with the higher value will assume ownership of the bundle. The tie breaker values can be arbitrarily assigned, such as the physical address of the termination unit's network interface card (not shown) or some other criteria, the details of which are not important.

If the termination unit holds the lower value (it lost the tie-breaker) it adds an entry into the map for the now foreign bundle, marks the mp_bundle_owner field FALSE, indicating that it is not the bundle owner and, hence, it is not responsible for reconstruction of the packet stream. The termination unit sends a new update message to the owner of the bundle identifying its stream and then flushes its buffers to the bundle owner, thereby routing the portion of the call received by the termination unit to the bundle owner. mp_bundle_owner is an entry in the list data structure of FIG. 7.

If the termination unit holds a higher value because it was assigned a higher value in the tiebreaker, or was assigned a higher value by an operator program at the destination, it immediately sends an advertisement to the peers. Specifically, it sends out a new bundle mapping update packet over the local area network 34 to the other termination units identifying and noting its ownership of the bundle.

The following PPP routines will be modified to implement the MPIP protocol.

n_input( )

This function's first test will be to check for an MPIP UDP packet. This test must be done extremely fast to prevent slowing down other IP traffic.

1. Test the IP protocol field looking for IP_PROTO_UDP.
2. If TRUE check for MPIP destination socket
3. If MPIP_DATA_SOCK then call asynchronous PPP input routine with port determined by bundle lookup. Search algorithm will key off to bundle id type and then first word or id to speed search.
4. If MPIP_CONTROL_SOCK then call mpip_in( ).

MPIP Specific Routines mpip_in( )

This function takes an MPIP_CONTROL_SOCK packet and processes it according to the type of packet. switch (type)

1. New Bundle—Check Link Redirection Table (the "LRT" otherwise known as the bundle map) for match.
   1. If the host termination unit (such as an ISDN gateway card or ISDN-GWC) owns the bundle, compare LAN MAC addresses.
      If host wins send out MPIP control packet with New Bundle type.
      If host loses send out MPIP control packet with New Link type.
   2. If host doesn't find entry in LRT, make a new entry and mark as redirected.

2. Sustained Bundle—Check LRT for matching entry.
   If found reset aging timer
   If not found create a new entry marked as redirected
   If found that host owns bundle, treat as New Bundle type
3. Dropped bundle—check LRT for match
   If not found discard information
   If found and sender is owner of record, delete entry else discard.
4. New Link—check LRT for match
   If found and host owns bundle, delete redirect link.
   If not found ignore
   default: discard information mpip_send(type, mp_bundle-struct*ptr)

This function will be responsible for the sending out of all types and sizes of packets. This keeps maintenance to a minimum.

type=MPIP_COMPLETE (full LRT advertisement), ptr=NULL
1. If no entries in table exit
2. Get memory buffer to hold message
3. Build MPIP header with empty entries count in message buffer
4. march down table, creating one appropriate entry in the packet for each entry in the LRT.

type=MPIP_FLASH(response to bundle ownership claims), ptr=target entry
1. get memory buffer to hold message
2. Build MPIP header with entries count equal to 1 in message buffer
3. create one entry in the packet for the entry in the LRT.
4. call network send routine mpip_timer( )

This function runs every 5 seconds.
1. Add 5 seconds to the complete update timer.
2. Is it time to run complete update?
   Yes call mpip_send with MPIP_COMPLETE code to cause all owned bundles to be advertised (invalid bundles are always advertised).
3. Run down the LRT and increase the age by 5 seconds for each entry. When an entry is 120 seconds old, it is marked as FALSE (invalid).
4. If an entry is 10 seconds past the time when it was marked invalid, delete it. This permits an aged out entry to be advertised 3 times as dead. This will ensure a faster end to orphaned redirected links than would normally occur with an aging-out.

Virtual Tunneling

In addition to sharing bundling information between termination units with the messaging described above, data streams for a bundle terminating on different termination units can be collected using virtual data stream tunneling.

As was illustrated in FIG. 3, supervisor computer 40 monitors the sharing of bundling information among termination units 28, 30 and 32 and directs the processing of the incoming calls among the termination units. The Multilink PPP Interspan Protocol ("MPIP") re-combines MP packet fragments onto one termination unit (e.g., 32, FIG. 3) when the links of an MP bundle (22, 24) are connected physically to different termination units (28,32). This is done through a MPIP control server residing on supervisor computer 40 (e.g., a UNIX server located on network 34) or on any of the individual termination units (28, 30, 32).

Figure 8A:
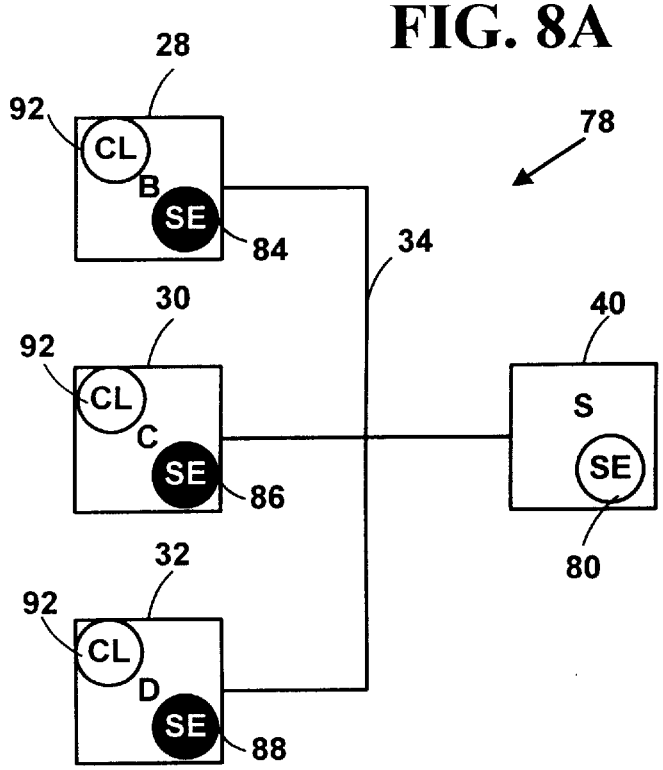
FIG. 8A is a block diagram illustrating a MPIP control server running on a supervisor computer 40.
Figure 8B:
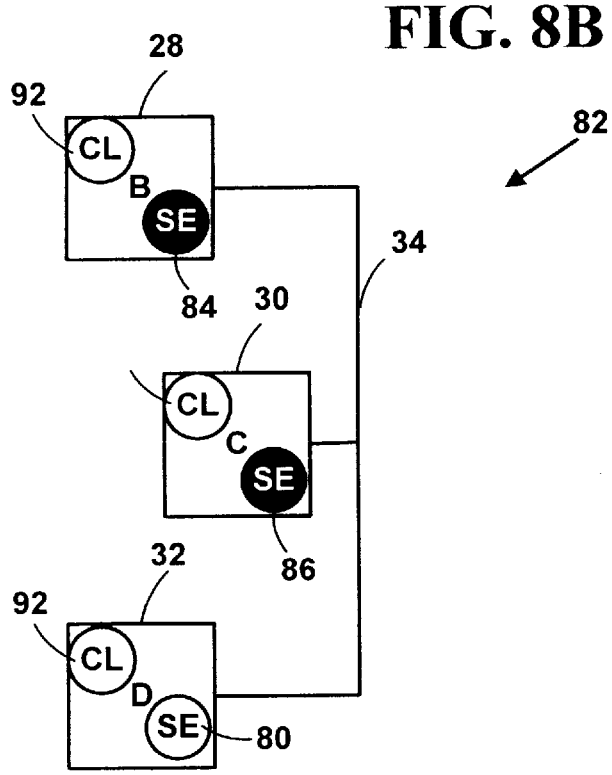
FIG. 8B is a block diagram illustrating a MPIP control server residing on a terminating unit without a supervisor computer.

In an illustrative embodiment of the present invention, virtual data stream tunneling is used to re-combine MP packets onto one termination unit. Virtual data stream tunneling is accomplished with a MPIP control SErver 80 ("SE") and a MPIP control CLient 92 ("CL") (FIGS. 8A and 8B). FIG. 8A is a block diagram 78 illustrating a "primary" MPIP control server 80 (i.e., white SE) running on a supervisor computer 40 and "secondary" or backup MPIP control servers (84,86,88) (i.e., black SE) running on terminating units (28,30,32). The present invention can be used with supervisor computer 40 (FIG. 8A) or without supervisor computer 40 (FIG. 8B). FIG. 8B is a block diagram 82 illustrating a primary MPIP control server 80 residing on a terminating unit 30 without supervisor computer 40.

In an illustrative embodiment of the present invention, one MPIP control server is used on each termination unit (FIG. 8B). One MPIP control client is also used on each termination unit. However, the present invention is not limited to one MPIP control server and one MPIP control client and more could also be used. MPIP control server 80 on termination unit 32 is a "designated" or primary control server (i.e., the white SE ) and the other servers (84,86) are "redundant" or secondary servers (i.e., the black SEs). If primary MPIP control server 80 has a problem, one of the remaining servers (84,86) will become the primary MPIP control server for termination unit 32 (See Table 17 below).

Figure 9A:
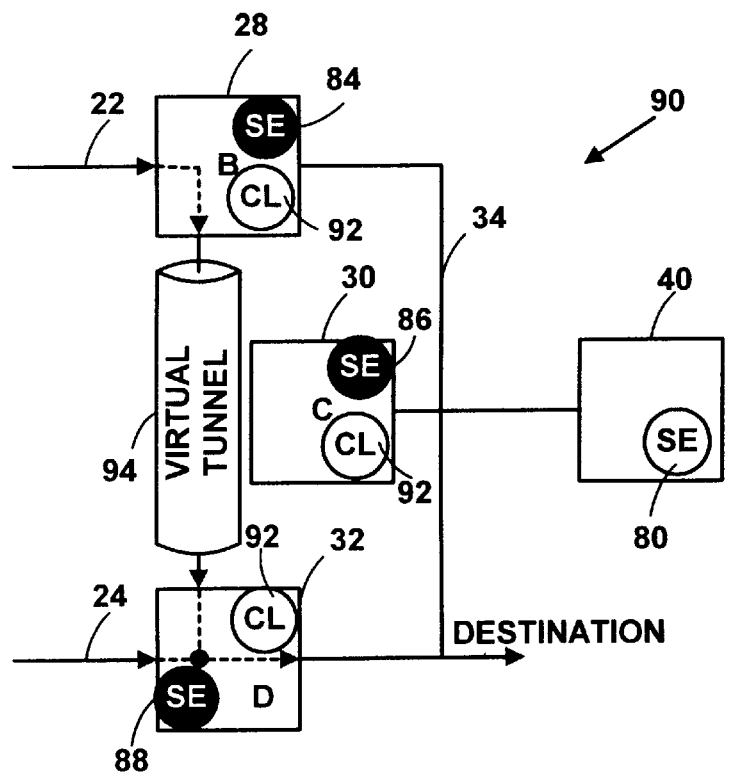
FIGS. 9A and 9B are block diagrams illustrating MPIP virtual tunneling.
Figure 9B:
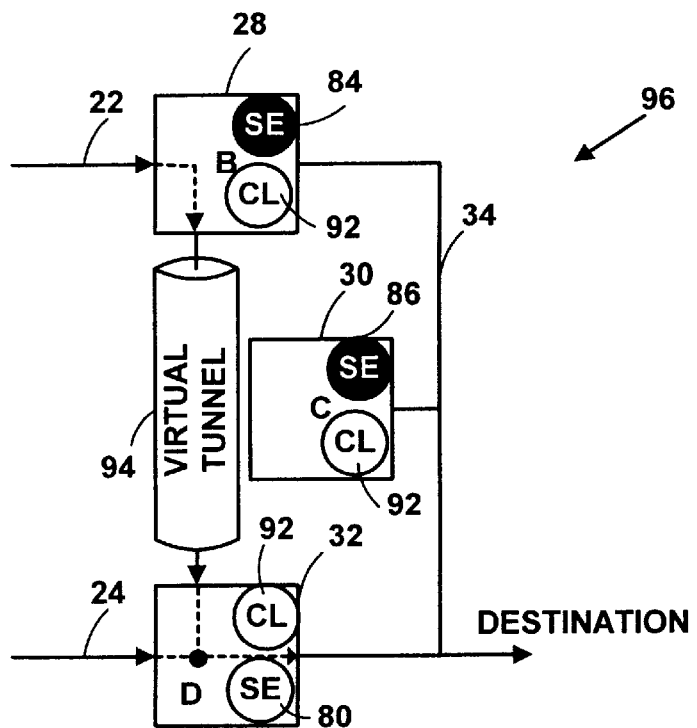

FIGS. 9A and 9B are block diagrams 90 and 96 illustrating virtual data stream tunneling with and without supervisor computer 40. MPIP control server 80 is responsible for keeping track of bundle owners and links used to send data streams for virtual data stream tunneling. When data streams for a bundle terminate on two or more different termination units, MPIP control server 80 will inform a MPIP control client 92 which termination unit owns the bundle (e.g., termination unit 32). Depending on bundle owner, MPIP control client 92 will establish a secure virtual data stream tunnel 94 to the bundle owner. Secure virtual data stream tunnel 94 is created and used to transfer data streams to the bundle owner. Data can also be transferred through secure virtual data stream tunnel 94 from a bundle owner (e.g., termination unit 32) to a non-bundle owner (e.g., termination unit 28).

FIG. 10 is a flow diagram illustrating a method 100 for coordinating the reconstruction of multiple data streams for a bundle on a termination unit that includes MPIP control server 80 with virtual data stream tunneling. Method 100 will be described in conjunction with FIG. 9B. As is shown in FIG. 9B, channels lines 22 and 24 for a bundle terminate on termination unit 28 and termination unit 32 respectively. However, the bundle owner is termination unit 32. Returning to FIG. 10, a test is conducted at step 102 on MPIP control server 80 on a first termination unit to determine if all data streams for a bundle are terminating on the first terminating unit. In FIG. 9B, the test is conducted from MPIP control server 80 on termination unit 32 which is responsible for keeping track of bundle owners and links for the data streams.

If some of the data streams are not terminating on the first termination unit, at step 104 in FIG. 10, the first termination unit requests the second termination unit create a virtual data stream tunnel and send the data streams terminating on the second termination unit through the virtual data stream tunnel to the first termination unit. In FIG. 9B, MPIP control client 92 on termination unit 28 receives the request from MPIP control server 80 on termination unit 32 and creates virtual data stream tunnel 94.

At step 106 in FIG. 10, the first termination unit collects the data streams sent through the virtual data stream tunnel and the data streams terminating directly on the first termination unit. At step 108 in FIG. 10, the first termination unit reconstructs the bundle and directs the data streams to the proper destination. In FIG. 9B, termination unit 32 collects the data streams for the bundle from line 24 and from virtual data stream tunnel 94 for line 22, reconstructs the data streams for the bundle, and directs the bundle to the proper destination.

FIG. 11 is a flow diagram illustrating a method 110 for coordinating the reconstruction of multiple data streams for a bundle on a termination unit that includes MPIP control client 92 with virtual data stream tunneling. Method 110 will be described in conjunction with FIG. 9B. At step 112, a second termination unit receives a request to create a virtual data stream tunnel between the second termination unit and a first termination unit. The second termination unit creates a virtual data stream tunnel between the second termination unit and the first termination unit at step 114. In FIG. 9B, the request to create a virtual data stream tunnel is received on MPIP control client 92 on termination unit 28. Termination unit 28 with MPIP control client 92 creates virtual data stream tunnel 94 between termination unit 28 and termination unit 32. At step 116 in FIG. 11, second termination unit sends the data streams terminating at the second termination unit through the virtual data stream tunnel to the first termination unit using a virtual data stream tunneling protocol which is explained below. In FIG. 9B, termination unit 28 sends data streams from line 22 through virtual data stream tunnel 94 to termination unit 32 using a virtual data stream tunneling protocol. Termination unit 32 collects the data streams and reconstructs the bundle at steps 106 and 108 of method 100 (FIG. 10).

FIG. 12 is a flow diagram illustrating a method 118 for coordinating the reconstruction of multiple data streams for a bundle on supervisor computer 40 that includes MPIP control server 80. FIG. 9A is used to illustrate method 118.

As is shown in FIG. 12, a test is conducted at step 120 on supervisor computer 40 to determine if all data streams for a bundle are terminating on a first terminating unit that is a bundle owner. If not, at step 122, supervisor computer 40 requests a second termination unit, which is also receiving a data stream from the bundle, to create a virtual data stream tunnel to the first termination unit. The second termination unit sends the data stream terminating on the second termination unit through the virtual data stream tunnel to the first termination unit. At step 124, the first termination unit collects the data streams sent through the virtual data stream tunnel by the second termination unit and those data streams terminating directly on the first termination unit. At step 126, the first termination unit reconstructs the bundle and directs the data streams to the proper destination from the first termination unit. Method 118 (FIG. 12) is similar to method 100 (FIG. 10) except that supervisor computer 40 is used with method 118. No supervisor computer 40 is used with method 100. See FIGS. 9A and 9B.

Figure 13:
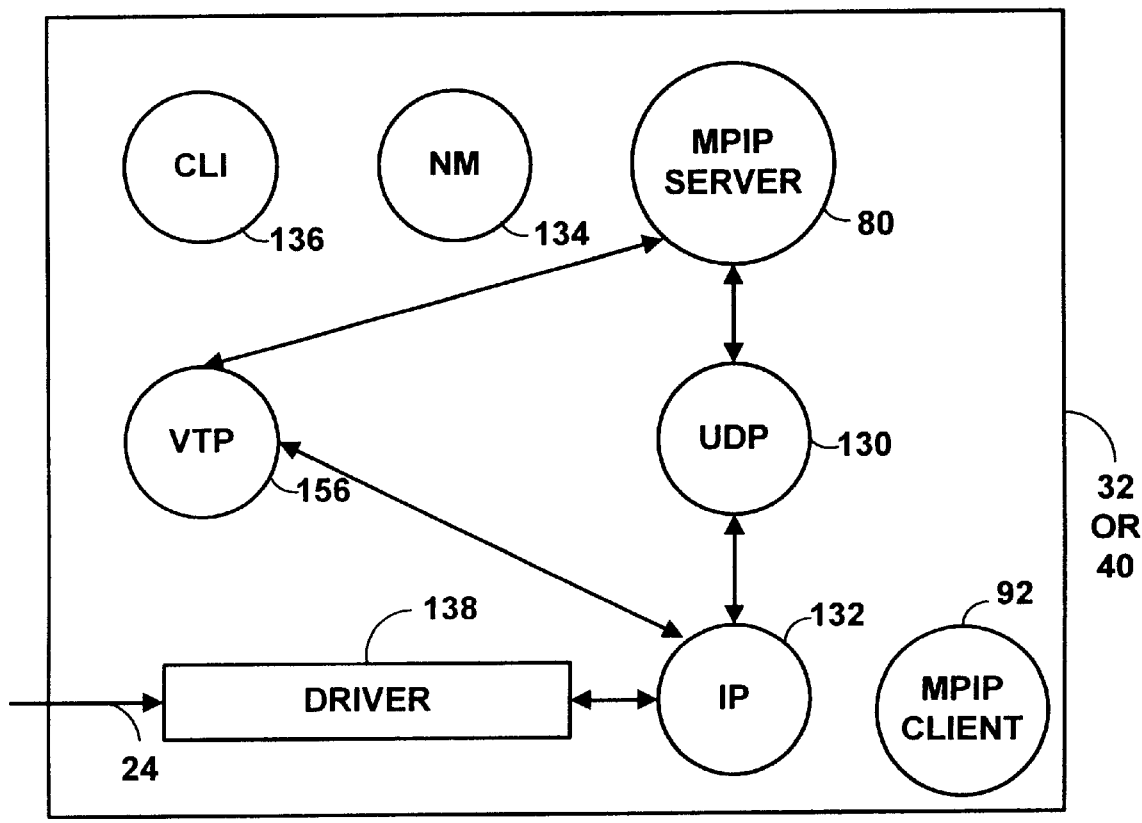
FIG. 13 is a block diagram illustrating software architecture for a MPIP control server.

FIG. 13 is a block diagram 128 illustrating software architecture used with active MPIP control server 80 on termination unit 32 or supervisor computer 40. The software architecture includes one or more software processes with designated functionality. However, more or fewer software process can also be used. MPIP control server 80 sends and receives MPIP control information with UDP 130 packets over IP 132 from driver 138. MPIP control server 80 receives configuration parameters from a Network Manager ("NM") 134 through a Command Line Interface ("CLI") 136. Virtual Tunneling Protocol stack ("VTP") 156 is used to help establish a virtual data stream tunnel and is explained below. MPIP control server 80 sends and receives MPIP data with VTP 156 packets over IP 132. Driver 138 is a network interface driver (e.g., a modem driver, a LAN driver, ISDN driver, etc.) that is used to send and receive data bits. MPIP control client 92 is inactive since MPIP control server 80 is active. However, more or fewer software components can be also used with MPIP control server 80.

Figure 14:
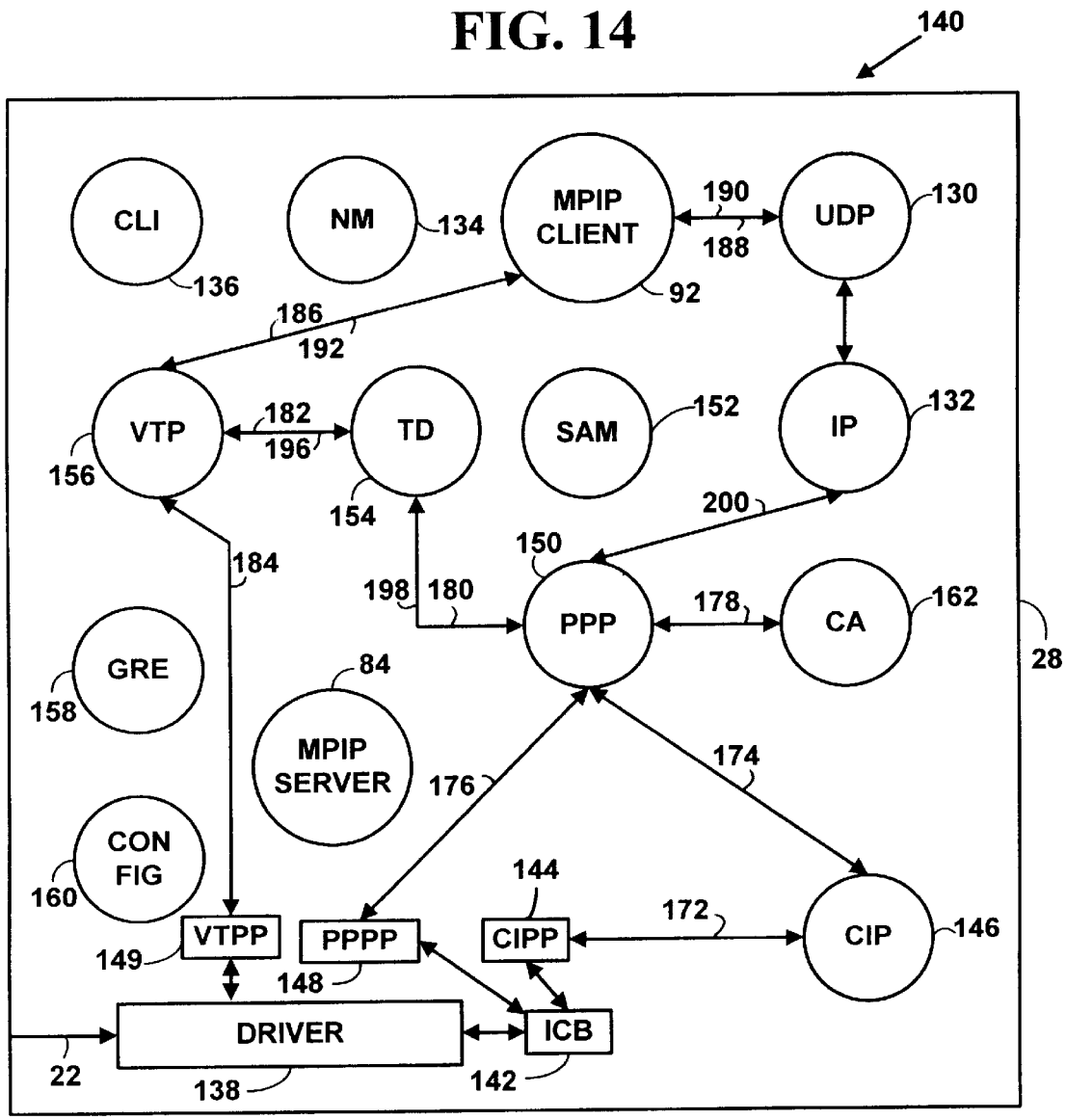
FIG. 14 is a block diagram illustrating in software architecture for a MPIP control client without a virtual data stream tunnel.

FIG. 14 is a block diagram 140 illustrating software architecture for a termination unit (28,30) with an active MPIP control client 92. The software architecture includes one or more software processes with designated functionality. However, more or fewer software processes can be used. MPIP control client 92 uses UDP 130 packets over IP 132 for communicating control information with MPIP control server 80. MPIP control client 92 uses VTP 158 packets over IP 132 for communicating data with MPIP control server 80. MPIP control client 92 uses NM 134 and CLI 136 to receive configuration parameters.

MPIP control client 92 listens on a default UDP port number of 5912 for control messages from MPIP control server 80. However, other UDP ports may also be used. MPIP control client 92 sends UDP 130 a UDP listen request message ("UDP_LISTEN_REQ") to open UDP listening port number 5912. After the port is opened, UDP 130 will receive control information from MPIP control server 80 over IP 132 addressed to port 5912 and pass them to MPIP control client 92. A UDP listen response message ("UDP_LISTEN_RSP") is sent by UDP 130 or IP 132 to MPIP control client 92 in response to the request. Table 1 illustrates pseudo-code for a data structure for a message to open a UDP port from MPIP control client 92. However, other data structure layouts could also be used.

TABLE 1

```
#define UDP_LISTEN_REQ
#define UDP_LISTEN_RSP
#define MPIP_CLIENT_UDP_PORT   5912
typedef struct_udp_listen_
{
        port_t       ul_port;
        ExecMBox     mbox;
        Void         correlator;
} UdpListenMsg;
```

To end communications between MPIP control server 80 and MPIP control client 92, MPIP control client 92 sends a UDP 130 ignore request message ("UDP_IGNORE_REQ") to close UDP listening port 5912. UDP 130 sends UDP ignore response message ("UDP_IGNORE_RSP") in response to the request message. Once the UDP port is closed, UDP 130 will not pass any UDP 130 messages from IP 132 to MPIP control client 92. Table 2 illustrates pseudo-code for a data structure for a message to close a UDP port from MPIP control client 92. However, other data structure layouts could also be used.

TABLE 2

```
#define UDP_IGNORE_REQ
#define UDP_IGNORE_RSP
typedef struct_udp_listen_
{
        port_t       ig_port;
} UdpIgnoreMsg;
```

MPIP control client 92 uses a UDP send request message ("UDP_SEND_REQ") to transmit MPIP control client packets to UDP 130. UDP 130 sends MPIP control client 92 a UDP send response message ("UDP_SEND_RSP") and fills in the message status field to indicate the result of the request. Table 3 illustrates pseudo-code for a UDP send request message data structure. However, other data structure layouts could also be used.

TABLE 3

```
#define UDP_SEND_REQ
#define UDP_SEND_RSP
typedef struct_udp_send_msg_
{
        struct udp_connusc_udpc;   /* Udp connection structure */
} UdpSendMsg;
```

When UDP 130 receives a control packet over IP 132 from MPIP control server 80, it will attach the received packet to a UDP receive data message ("UDP_RX_MSG") and send it to MPIP control client 92. There is no response to this message. MPIP control client 92 will free the packet after it is received. Table 4 illustrates pseudo-code for a UDP receive message data structure. However, other data structure layouts could also be used.

TABLE 4

```
#define UDP_RX_MSG
typedef struct_udp_rx_msg_
{
        inaddr_t    host;
        port_t      src;
        void        *correlator;
} UdpRxMsg;
```

MPIP control server 80 also uses the data structures shown in Tables 1–4 to open and use a UDP port to communicate with MPIP control client 92.

Returning to FIG. 14, Interface Control Block ("ICB") 142 is an interface to driver 138. Call Initiation Process Portal ("CIPP") 144 is a connection into driver ICB 142 to detect incoming calls from Call Initiation Process ("CIP") 146. PPP Portal ("PPPP") 148 is a PPP connection into ICB 142 to send/receive PPP messages. PPP protocol stack 150 is used to process PPP messages. Security Association Manager ("SAM") 152 is used to authenticate a virtual data stream tunnel session. Tunnel Dispatcher ("TD") 154 helps establish a virtual data stream tunnel 94 and uses a Virtual Tunnel Protocol stack ("VTP") 156, hereinafter VTP 156, to send data streams though virtual data stream tunnel 94. MPIP data is encapsulated in VTP 156 packets and sent over IP 132. Generic Routing Encapsulator ("GRE") 158 encapsulates PPP packets with MPIP control information and sends them over IP 132. Configuration process 160 is used to configure MPIP control client 92. Call Authenticator ("CA") 162 authenticates a call on a termination unit. MPIP control server 84 is inactive since MPIP control client 92 is active on termination unit 28. However, more or fewer software architecture components can be used with MPIP control client 92.

Figure 15C:
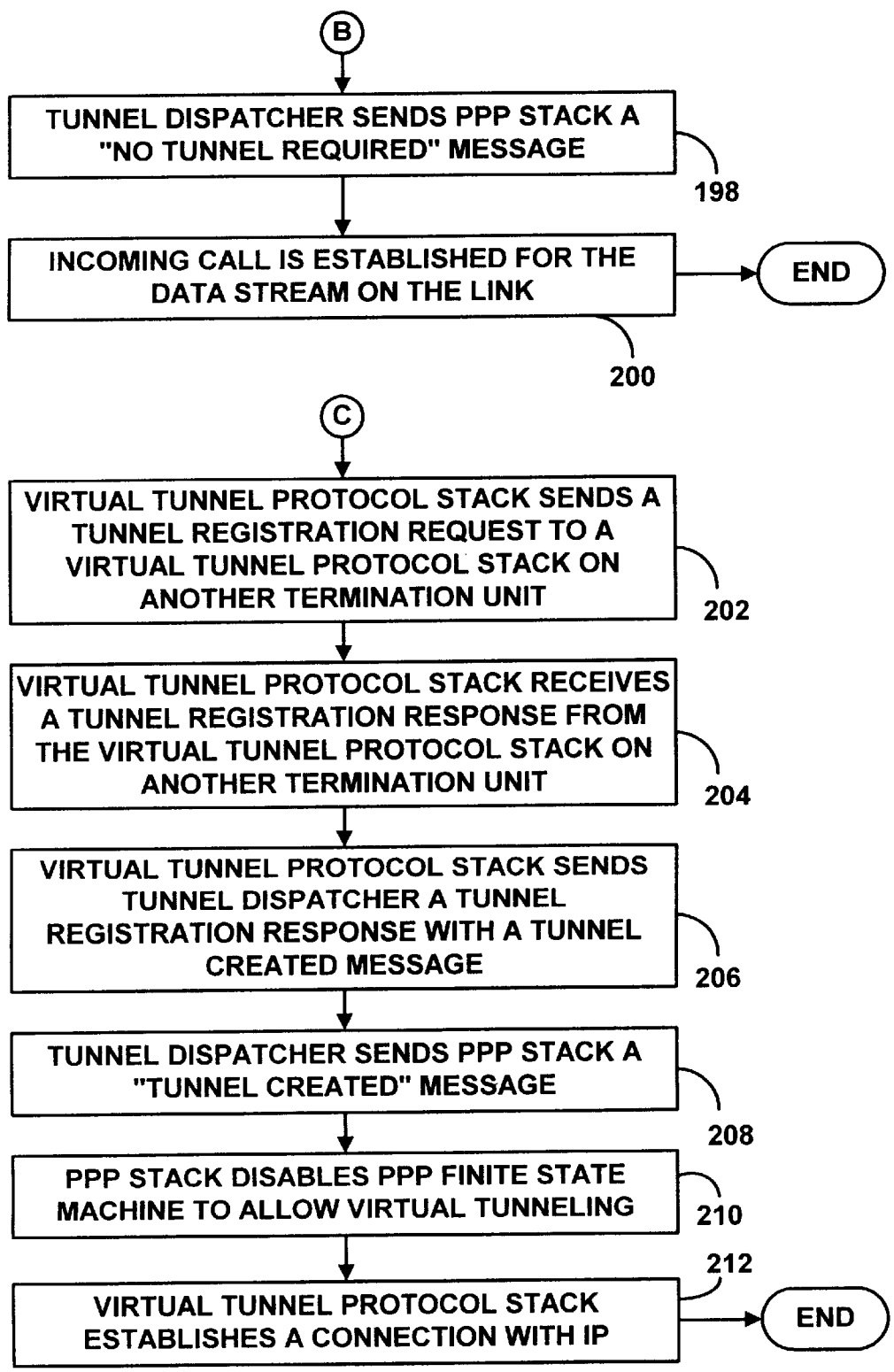

FIGS. 15A, 15B and 15C are a flow diagram illustrating a method 170 for establishing a data stream on a link with MPIP control client 92. Message interfaces are described only with respect to MPIP control client 92 and MPIP control server 80. Message interfaces to/from other processes are similar to those used for MPIP control client 92 and MPIP control server 80. At step 172 in FIG. 15A, CIP 146 detects an incoming call on link 22 for a data stream on driver 138 via CIPP 144. At step 174, CIP 146 sends a message to PPP protocol stack 150, hereinafter PPP 50, to connect the incoming call on link 22 for a data stream. At step 176, PPP 150 opens PPP portal 148 to provide a PPP connection to driver's 138 ICB 142 to handle the incoming call for the data stream on link 22. At step 178, PPP authenticates the call by sending a message to CA 162. At step 180, PPP 150 optionally sends a message to TD 154 to determine who the bundle owner is for link 22 being used by the incoming call. PPP 150 calls TD 154 only if an Endpoint Discriminator for MPIP was supplied to PPP 150 indicating that virtual tunneling may beused. At step 182, TD 154 sends a message to VTP stack 156 to determine if link 22 has to be tunneled. At step 184 VTP stack creates a VTP Portal ("VTPP") 149 to driver 138. VTP stack 156 sends a message to MPIP control client 92 to register link 22 for the data streams being used for the incoming call at step 186 in FIG. 15B.

In an illustrative embodiment of the present invention, a message header is used when sending/receiving MPIP packets to/from MPIP control server 80. An attribute header is used along with the MPIP header. The attribute header specifics attribute types and contents of the attribute types. The attribute header is used along with the MPIP header when building data for different types of requests specified in the MPIP header.

Table 5 illustrates pseudo-code for a MPIP message header and attribute header. However, more or fewer fields could be used in the message header and attribute header.

TABLE 5

```
typedef struct mpip_header
{
    Uint16    command;         // Type of request
    Uint16    version;         // version # for backward comp.
    Uint32    identifier;      // request identifier
    Uint16    length;          // length of the whole packet
    Uint16    flags;           // flags to indicate more info
    Uint8     vector[16];      // pseudo-random value
    Uint8     mac[16];         // Msg Authenticated Check
} MPIP_HDR;
//The following are the different types of commands.
#define MPIP_LINK_REG_REQ       0x01
#define MPIP_LINK_REG_RSP       0x02
#define MPIP_LINK_DEREG_REQ     0x03
#define MPIP_LINK_DEREG_RSP     0x04
typedef struct attribute_hdr
{
    Uint16    attribute_type;   // Attribute Type
    Uint16    attribute_length; // Length of the packet
    union
    {
        Uint32    attribute_value;
        Uint8     attribute_string[64];
    }attribute_data
}ATTRIBUTE_HDR;
//The following option attribute types will be for different command values
#define MPIP_BUNDLE_INFO                1
#define MPIP_EDO_TYPE                   2
#define MPIP_EDO_VALUE                  3
#define MPIP_USER_NAME                  4
#define MPIP_BUNDLE_OWNER               5
#define MPIP_BUNDLE_OWNER_SESSION_KEY   6
#define MPIP_YOUR_SESSION_KEY           7
#define MPIP_END_OF_INFORMATION         8
```

For link a registration request, data indicators shown in Table 6 are sent to the MPIP control server 80. However, more or fewer data indicators could also be used.

TABLE 6

1. Endpoint Discriminator Option ("EDO") Class/Type: indicates the identifier address space.
2. EDO Address: indicates the identifier address within the selected class. The length varies based on EDO Class/Type.
3. User Name: Name of the user who dialed-in.

Figure 17:
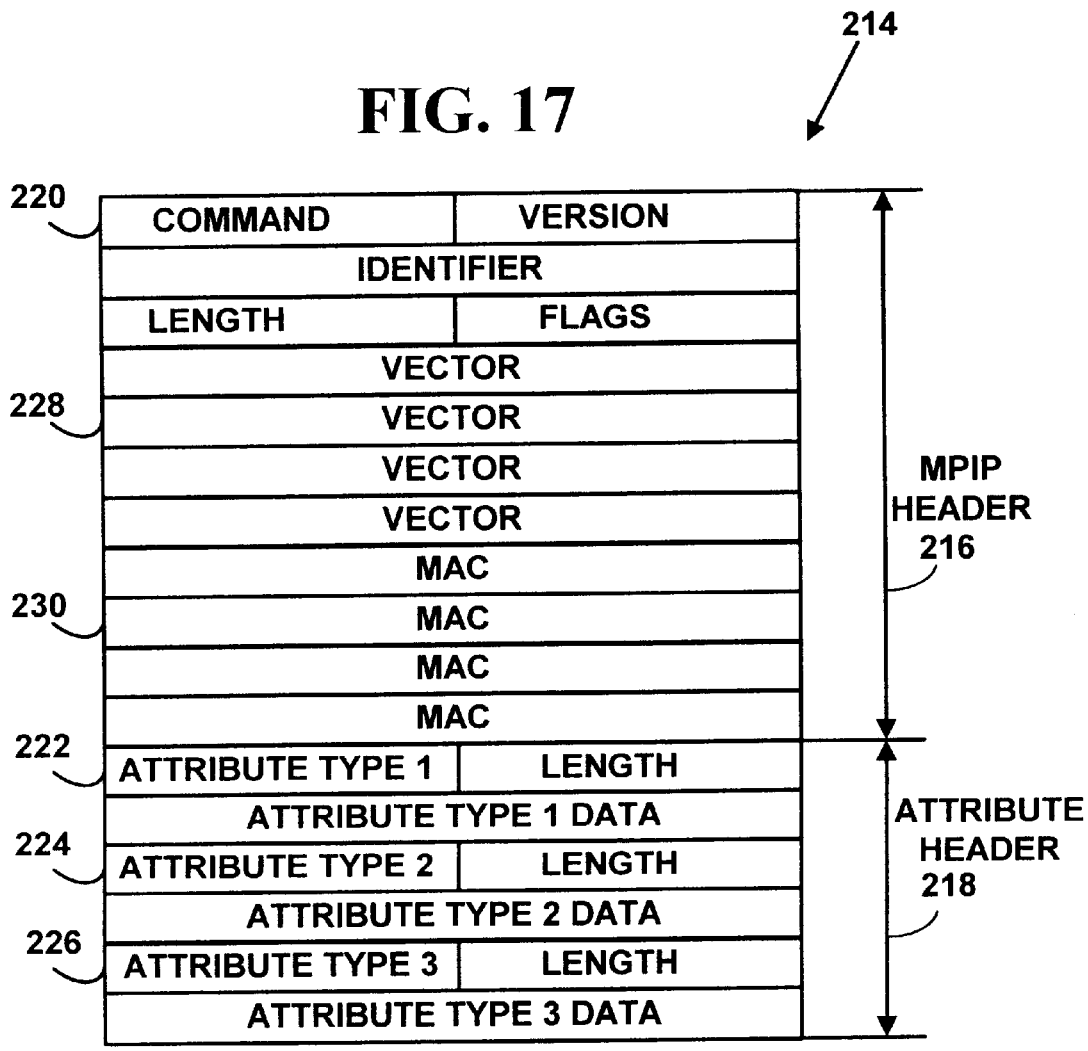
FIG. 17 is a block diagram illustrating a data structure for a MPIP message header.

FIG. 17 illustrates a MPIP control message 214. The MPIP control message includes a MPIP header 216 and an attribute header 218.

Returning to FIG. 15B, at step 188 MPIP control client 92 sends a link registration request message ("MPIP_LINK_REG_REQ") to MPIP control server 80. For the link registration request, command 220 (FIG. 17) in MPIP header 216 is set to MPIP_LINK_REG_REQ (Table 5), attribute-type-1 222 (FIG. 17) is set to MPIP_EDO_TYPE (Table 5), attribute-type-2 224 (FIG. 17) is set to MPIP_EDO_VALUE (Table 5) and attirbute-type-3 226 (FIG. 17) is set to MPIP_USER_NAME (Table 5) in MPIP attribute header 218.

Before sending the link registration request message at step 188, MPIP control client 92 calculates vector fields 228 and Message Authenticated Check ("MAC") fields 230 (FIG. 17). The value for the vector fields 228 and MAC fields 230 are calculated using the steps shown in Table 7. However, more or fewer steps could also be used to calculate vector fields 228 MAC fields 230.

TABLE 7

1. Set the MAC fields 230 to zero.
2. Fill the vector fields 228 are filled in with a pseudo-random number.
3. Concatenate a shared secret to the message.
4. Calculate a MD-5 value for the entire message including the shared secret.
5. Copy the MD-5 result for the entire message into the MAC fields 230.

As is known in the art, MD-5 is a secure, one-way hash function used to create a secure hash value that is used to authenticate messages. However, other secure hash functions or encryption techniques could also be used. As is also known in the cryptography arts, a shared secret is a shared secret password.

After receiving the link registration request message, MPIP control server 80 checks the integrity of the message with the steps shown in Table 8. However, more or fewer steps could also be used.

TABLE 8

1. Save the MAC value from the MPIP header.
2. Set the MAC value to zero in the message.
3. Concatenate the shared secret to the message and calculate the MD-5 hash value on the new message including the shared secret.
4. If the MD-5 hash value does not match the saved MAC value then the message is corrupted, so the request will be rejected. Otherwise, proceed to find out the bundle owner and generate the session keys.

If the integrity of the message from MPIP control server 92 checks out as valid, MPIP control server 80 determines whether the bundle owner is different than the MPIP control client 92 that sent the link registration request message. If the bundle owner is different than MPIP control client 92 that sent the link registration request message, the MPIP control server generates session keys that will be used for virtual tunneling. If the bundle owner is not different than MPIP control client 92 that sent the link registration request message, no virtual tunneling will be used and not session keys are generated.

MPIP control server 80 sends the data items shown in Table 9 to MPIP control client 92 in a link registration response message. However, more or fewer data items with different sizes could also be sent.

TABLE 9

1. Bundle Owner: a bundle owner's IP address as 32-bits
2. Client Session Key: an encrypted client session key as an array of 16 bytes.

TABLE 9-continued

| 3. | Peer Session Key: | an encrypted peer session key as an array of 16 bytes. |
|---|---|---|

MPIP control server 80 encrypts the generated session keys with the steps shown in Table 10. However, more or fewer steps could also be used.

TABLE 10

1. Generate a session key.
Encrypt the Session Key for a MPIP Control Client 92
2. Find a MPIP Control Client's 92 shared secret with the MPIP Control Server 80.
3. Concatenate the MPIP Control Client's 92 shared secret to vector 228 from MPIP header 216 and then hash the result using the MD-5 hashing function.
4. XOR the result of the MD-5 hashing function with Session key generated at step 1.
Encrypt the Session Key for a Peer:
2. Find a bundle owner's shared secret with MPIP control server 80.
3. Concatenate the bundle owner's shared secret to vector 228 and then the result using the MD-5 hashing function.
4. XOR the result of the MD-5 hashing function with the Session key generated at step 1.

After generating the peer and client session keys, MPIP control server 80 sets command 220 (FIG. 17) in MPIP header 216 to MPIP_LINK_REG_RSP (Table 5), attribute-type-1 222 to MPIP_BUNDLE_OWNER (Table 5), attribute-type-2 224 to MPIP_BUNDLE_OWNER_SESSION_KEY (Table 5), attirbute-type-3 226 to MPIP_YOUR_SESSION_KEY (Table 5) in MPIP attribute header 218. Vector fields 228 and MAC fields 230 are calculated as was described above in Table 7. MPIP control server 80 then sends a link registration response message ("MPIP_LINK_REG_RSP") back to MPIP control client 92.

To de-register a link (not shown in FIG. 15), MPIP control client 92 sends a link de-registration request message ("MPIP_LINK_DEREG_REQ") to MPIP control server 80. For link a de-registration request message, command 220 (FIG. 17) in MPIP header 216 is set to MPIP_LINK_DEREG_REQ (Table 5), attribute-type-1 222 is set to MPIP_EDO_TYPE (Table 5), attribute-type-2 224 is set to MPIP_EDO_VALUE (Table 5) and attirbute-type-3 226 is set to MPIP_USER_NAME (Table 5) in MPIP header 216. The vector fields 218 and the MAC fields 220 are filled in the same manner as for a link registration request and described in Table 7.

For a link de-registration response message ("MPIP_LINK_DEREG_RSP"), MPIP control server 80 sends the bundle owner's IP address to MPIP control client 92. For link a de-registration response message, MPIP control server 80 sets command 220 (FIG. 17) in MPIP header 216 to MPIP_LINK_DEREG_RSP (Table 5), attribute-type-1 222 to MPIP_BUNDLE_OWNER (Table 5) in MPIP attribute header 218. The MAC fields 228 and vector fields 230 are filled as described in Table 7.

Returning to FIG. 15B at step 190, MPIP control client 92 receives the link registration response message from MPIP control server 80. The response contains the bundle owner for link 22 being used for the incoming call, session keys (Table 10) for link 22.

At step 192, MPIP control client 92 finally sends a register link response message ("TD_REG_LINK_RSP") to TD 154. MPIP control client 92 sends the data items shown in Table 11. However, more or fewer data items could also be sent.

TABLE 11

| 1. | Bundle Owner: | IP address of the bundle owner |
|---|---|---|
| 2. | SPI value: | Security Parameter Index. |

Table 11 includes a Security Parameter Index ("SPI") for the request. The SPI helps ensure an incoming call and a virtual data stream tunnel is secure by allowing verification of peer and session keys created by MPIP control server 80 from a termination unit.

Table 12 illustrates pseudo-code for a register link response message data structure. However, other data structure layouts could also be used.

TABLE 12

```
#define TD_REG_LINK_RSP
typedef struct_tdregister_link_req_
{
    Uint32    bundle_owner;
    Uint32    spi_value;
} TDRegisterLinkRsp;
```

Based on the client and peer keys sent to VTP 156 by MPIP control client at step 192, VTP 156 determines if the bundle owner and the incoming link are terminating on the same termination unit at step 194.

If the bundle owner and the incoming link terminate on the same termination unit, no virtual data stream tunnel 94 is required (i.e., all data streams for a bundle are terminating on the same termination unit) and at step 196, VTP 156 responds with a "no tunnel required message" to TD 154. At step 198 in FIG. 15C, TD 154 sends PPP protocol stack 150 a "no tunnel required" message. The call is completed at step 200 by allowing PPP protocol stack 150 to setup a connection with IP 132. FIG. 14 illustrates a data flow for steps 172–200 of method 170 in FIGS. 15A, 15B and 15C for the situation when no virtual data stream tunnel 94 is required. The numbers above and below the arrows in FIG. 14 are steps from method 170 illustrated in FIGS. 15A, 15B and 15C.

If a data stream owner is not on the same termination unit as where a bundle owner is terminating, at step 202 in FIG. 15C, VTP stack 156 on termination unit 28 sends a tunnel registration request to VTP stack 156 (e.g., a VTP stack client) on first termination unit 32. At step 204, VTP stack 156 on second termination 28 receives a tunnel registration response from VTP stack 156 on first termination unit 32, and virtual data stream tunnel 94 is established between second termination unit 28 and first termination unit 32. At step 206, VTP 156 sends TD 154 a response that a virtual data stream tunnel has been established with a "tunnel created" message. At step 208, TD 154 sends PPP 150 a "tunnel created" message. At step 210, PPP 150 switches off its PPP finite state machine to allow data to be sent through the virtual data stream tunnel 94. At step 212, VTP 156 establishes a connection with IP 132.

Virtual data stream tunnel 94 is now ready for use between first termination unit 32 and second termination unit 28. Since a virtual data stream tunnel 94 exists between two termination units (28,32), when it comes to sending data streams between the termination units, virtual data stream tunnel 94 is treated as a local virtual data stream tunneling port on both the termination units (28,32). Data streams received on second termination 28 are directed to first termination 32 through virtual data stream tunnel 94 (FIG. 9B).

Figure 16:
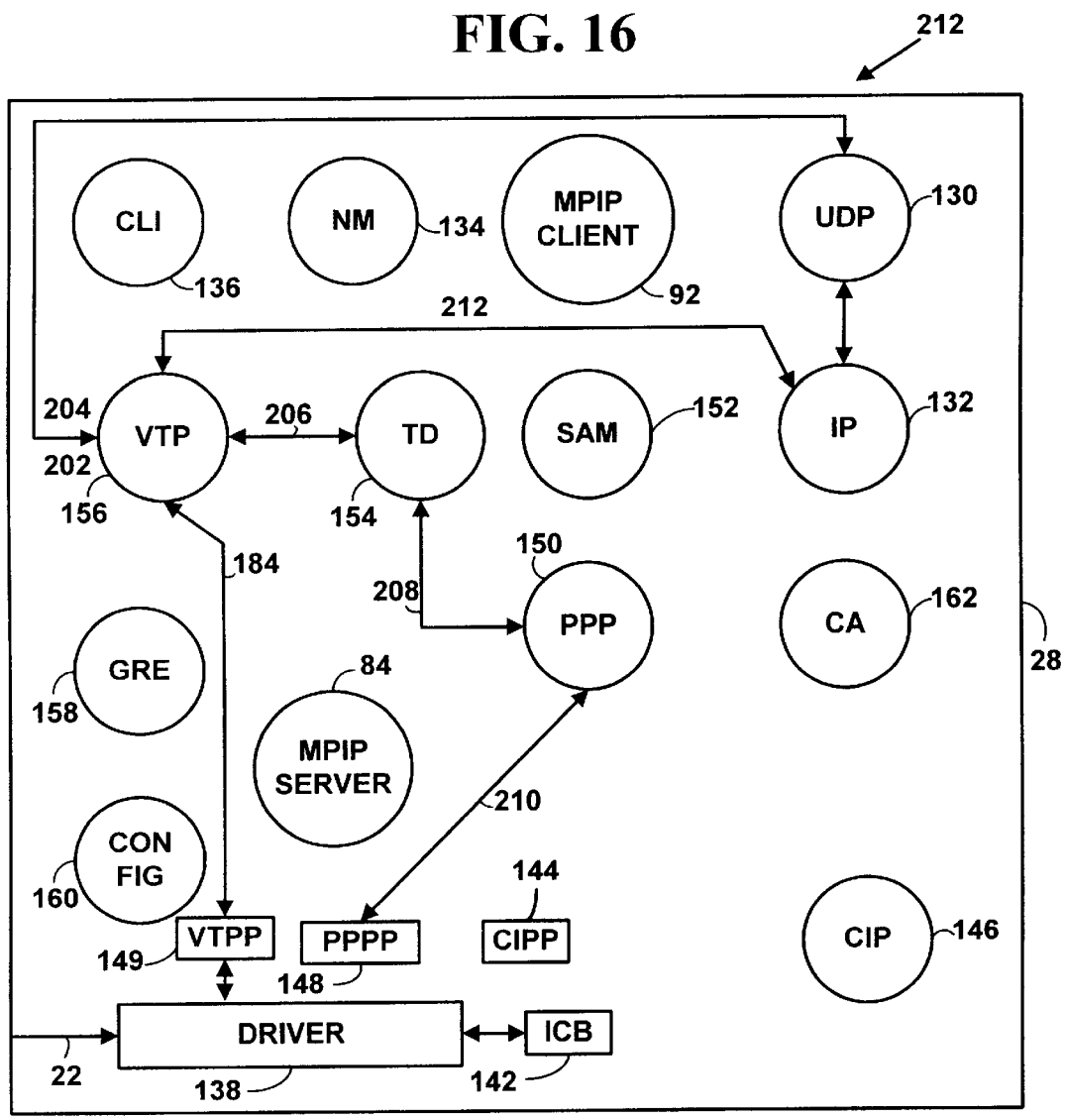
FIG. 16 is a block diagram illustrating data flow in a software architecture for a MPIP control client with a virtual data stream tunnel.

FIG. 16 is a block diagram 214 illustrating data flow for steps 202–212 of FIG. 15C. The data flow numbers for FIGS. 15A and 15B are not included in FIG. 16. In addition, the invention is not limited to the steps in method 170 or the data flows shown in FIG. 14 and FIG. 16. More or fewer steps and other data flows can also be used to create a virtual data stream tunnel. VTP stack 156 uses IP to send/receive data steams as VTP data as is illustrated by connection 212 in FIG. 16 and is explained below.

Virtual data stream tunneling security

Security is provided through virtual data stream tunnel 94 with the exchange of session keys generated by MPIP control server 80. A termination unit (28, 30) with a MPIP control client 92 is configured to share a secret password, (i.e., a shared secret) with MPIP Control Server 80. Whenever a MPIP control server 80 receives a message to setup a virtual data stream tunnel 94, the MPIP control server 80 calculates a key based on MD-5 hashing function (e.g., k1=MD5(IV|K)XOR SA1) and then the entire inbound packet is authenticated using the MD-5 hashing function. For example, IV is initialization vector 228, K is a MD-5 key, XOR is the exclusive-OR operation, and SA1 is a shared secret. However other secure hashing functions could also be used. A foreign-home extension is used in all VTP messages in order to keep the tunnels secure. This means that a malicious user will have great difficulty in generating valid messages and cause havoc with a "denial of service" message attack.

Each tunnel setup, teardown and refresh message has its own time-stamp. Messages with invalid time-stamps are dropped so that malicious user can not replay packets at will in order to create tunnels and disrupt the regular network activity.

Virtual data stream tunneling protocol

The stream data for a bundle is carried in a virtual data stream tunneling protocol created by VTP stack 156. In another embodiment of the present invention, a Layer Two Tunneling Protocol ("L2TP") is used as a virtual data stream tunneling protocol instead VTP stack 156. However, other tunneling protocols (e.g., Point-to-Point Tunneling Protocol, ("PPTP") ) can also be used and the invention is not limited to VTP stack 156 or L2TP. L2TP and PPTP are currently defined by the Internet Engineering Task Force ("IETF") in "Draft Documents" from the PPP working Group, incorporated herein by reference. As is known in the art, Draft Documents occur before Request For Comment ("RFC") documents. More information on L2TP and PPTP can be found on the World Wide Web at Uniform Resource Locators ("URLs") ds.internic.net, nic.nordu.net, ftp.nisc.sri.com, or munnari.oz.au. See also, IETF RFC 1661, which currently specifies multiprotocol dial-up via PPP. The above documents are incorporated by reference herein.

L2TP permits virtual data stream tunneling of a data link layer (e.g., HDLC, and asynchronous HDLC) of PPP. As is known in the art, the Open System Interconnection ("OSI") model is used to describe computer networks. The OSI model consists of seven layers including from lowest-to-highest, a physical, data link, network, transport, session, application and presentation layer. The physical layer transmits bits over a communication link. The data link layer transmits error free frames of data. HDLC is High-level Data Link Control protocol. HDLC is a bit oriented protocol that supports both half-duplex and full-duplex communications. Using such virtual data stream tunnels, it is possible to divert the location of data streams terminating on an initial termination unit to a termination unit at which a bundle is terminated.

L2TP includes an L2TP Access Concentrator ("LAC") and a L2TP Network Server ("LNS"). A LAC is a device attached to one or more PSTN or ISDN lines (e.g., line 22 on termination unit 28) capable of PPP operation and of handling the L2TP protocol. The LAC needs only implement a connection media (e.g., UDP) over which L2TP is to operate to pass traffic to a LNS. It may tunnel any protocol carried within PPP.

An LNS operates on any platform capable of PPP termination (e.g., termination unit 32). Since L2TP relies only on the single media (e.g., UDP) over which L2TP tunnels arrive, the LNS may have only a single LAN or WAN interface, yet is still able to terminate calls arriving at any LAC (e.g., termination unit 28). The LAC's may have a full range of PPP interfaces (asynchronous, synchronous ISDN, etc.).

L2TP defines a set of control messages sent in packets over a virtual data stream tunnel between an LNS and a given LAC. The exact technique for initiating a tunnel between an LNS-LAC pair is specific to the tunnel media selected (e.g., UDP). Once media-level connectivity is reached, L2TP message formats define the protocol for a LAC and LNS to manage a virtual data stream tunnel and its associated sessions.

L2TP uses the well-known UDP port 1701. However, other UDP ports could also be used. The entire L2TP packet, including payload and L2TP header, is sent within a UDP datagram. The initiator of a virtual data stream tunnel (e.g., termination unit 28) using L2TP picks an available source UDP port, and sends it to the desired destination (e.g., termination unit 32) at port 1701. The recipient picks a free port on its own system, and sends its reply to the initiator's UDP port, setting its own UDP source port set to the free port it found. All subsequent packets exchanged will use these UDP ports. It is legal for a peer's IP address used for a given virtual data stream tunnel to change over the life of a connection; this may correspond to a peer with multiple IP interfaces responding to a network topology change. Responses reflect the last source IP address for that Tunnel ID.

When operating over UDP, both the "I" and "C" bits should be present, and are used to permit correct demultiplexing and virtual data stream tunnel identification. The default for any L2TP implementation is that UDP checksums should be enabled for both control and payload messages. An L2TP implementation may provide an option to disable UDP checksums for payload packets. However, it is recommended that UDP checksums always be enabled on control packets.

Configuration parameters

A user can change configuration parameters from CLI 136 (FIGS. 13 and 14). Configuration parameters are held in RAM until the user issues a "save" command from CLI 136. At the time of boot-up and after all software processes are created, NM 134 will send the configuration parameters that are related to MPIP control client 92. MPIP control client 92 is responsible for initializing these variables. Whenever user sets a parameter related MPIP control client 92 from CLI 136, NM 134 will send those requests to MPIP control client 92 and it is the responsibility of MPIP control client 92 to manage those configuration variables. A MPIP control server 80 behaves in a similar manner.

A user can turn MPIP control server 80 "on" or "off" from CLI 136. On boot-up, NM 134 also sends configuration parameters to MPIP control server 80. The parameters shown in Table 13 are set by a user from CLI 136. However, more or fewer parameters or parameters of different sizes could also be used.

TABLE 13

| Parameters | Valid Values |
|---|---|
| Shared secret (with the MPIP control client) | alphanumeric value of 16 bytes |
| Server List | IP address in dot notation, 4 bytes |

The commands used from CLI 136 are shown in Table 14. However, more or fewer commands could also be used.

TABLE 14

| Commands | Explanation |
|---|---|
| add mpip_server <IP ADDRESS>/[<PORT>] <SHARED SECRET> | Adds an MPIP control server to the "static MPIP control server list". |
| set mpip_server <IP ADDRESS>/[<PORT>] <SHARED SECRET> | Once an MPIP control server is added, this command can be used for changing the port number and shared secret. |
| delete mpip_server <IP ADDRESS> | Deletes the MPIP control server from the "static MPIP control server list". |
| list mpip_server | Lists all the MPIP control servers (dynamic & static). |
| add mpip_client <IP ADDRESS> <SHARED SECRET> | Adds an MPIP control client to the MPIP control client list. |
| set mpip_client <IP ADDRESS> <SHARED SECRET> | Once an MPIP control client is added, this command can be used for changing the shared secret. |
| delete mpip_client <IP ADDRESS> | Deletes the MPIP control client from the client list. |
| list mpip_client | Prints the list of all the MPIP control clients. |
| set mpip_server_priority <0–255> | Sets the MPIP control server priority. This value will be used in selecting the primary and secondary MPIP control servers. |
| set mpip_server <ON \| OFF> | Turns the MPIP control server on or off on a given termination unit. |

One of the configuration parameters is the "status" of MPIP control server 80. MPIP control server 80 can be have an "on" or "off" status. Turning MPIP control server 80 "on" includes: (1) accepting and processing messages from NM 134 as well as other processes on a termination unit; (2) opening a UDP port for sending/receiving messages from MPIP control client 92; (3) joining a multicast group and sending multicast packets; (4) maintaining a list of all MPIP control clients; (5) maintaining a list of bundles and links being used by the termination units; and (6) sending a null EDO in a PPP-LCP configuration registration. Turning MPIP control server "off" includes: (1) leaving a multicast group; (2) closing the UDP port; and (3) accepting and processing messages only from NM 134.

MPIP control server 80 uses the information in Tables 1–10 to interact with MPIP control client 92 and UDP 130. Table 15 illustrates additional constants add to Table 5 for MPIP control server 80.

TABLE 15

| #define MPIP_LINK_DEREG_RSP | 0x04 |
|---|---|
| #define MPIP_SERVER_REQ | 0x05 |
| #define MPIP_SERVER_RSP | 0x06 |
| #define MPIP_LINK_REG_REJ | 0X09 |
| #define MPIP_SERVER_HELLO_REQ | 0x0C |
| #define MPIP_SERVER_I_AM_HERE | 0x0D |
| #define MPIP_SERVER_I_AM_HERE_ACK | 0x0E |

MPIP Server multicast groups

MPIP control servers (80,84,86,88) can join or leave a multicast group. A class-D IP address (e.g., 224.0.0.37) is used when joining or leaving the MPIP multicast group. A datagram with class-D destination address is delivered to every interface on the network that has joined the MPIP multicast group. When an MPIP control server 80 comes up it, automatically joins the MPIP multicast group and sends "Hello" packets with a class D destination IP address.

Multicast "Hello" packets are sent by all the MPIP control servers (80,84,86,88) on boot-up. A neighbor who receives the "Hello" packet unicasts the Hello packet with its view of designated and backup designated servers. Each Hello packet includes the list of all the MPIP control servers from which a Hello packet has been received. After establishing two-way communication between two MPIP control servers, they exchange point-to-point (unicast) "Hello" packets periodically to make sure that the MPIP control servers at both ends of network are active.

Table 16 illustrates pseudo-code for a Hello message data structure. However, other data structure layouts could also be used.

TABLE 16

```
typedef struct_hello
{
    u_char h_hintv[2];      // Hello Interval (seconds)
    u_char h_opts;          // Options
    u_char h_prio;          // Sender's server priority
    u_char h_rdintv[4];     // Seconds before declare dead
    u_char h_dms_ip[4];     // IP Address of the DMS
    u_char h_bdms_ip[4];    // IP Address of the BDMS
    u_char *h_neighbor;     // List of Active Servers
} Hello
```

A logical connection between a pair of MPIP control servers is called an "adjacency." If there are N number of MPIP control servers, each MPIP control server can establish adjacencies with N−1 MPIP control servers. So there can be total of N*(N−1)/2 adjacencies. For example, if N=4, the total number of adjacencies are 6. The number of adjacencies can be reduced by having a Designated MPIP Server ("DMS") 80 (FIG. 8B). So the other MPIP control servers have to establish adjacencies only with DMS. A DMS is elected. After electing the DMS, the other MPIP control servers will bring up their adjacencies with DMS and synchronize their databases with a database on the DMS.

The MPIP control servers will have a default priority value of 100. If the priority for a MPIP control server is zero, then that MPIP control server will never be a DMS. To become a DMS, a MPIP control server must have established 2-way communication (i.e., be in 2-way or higher state), and must have a non-zero priority. The election process is shown in Table 17 below. However, more or fewer steps can be used in the election process.

TABLE 17

1. If one or several neighboring MPIP control servers proposed themselves as DMS, the one with the largest priority will be selected as DMS. If the priorities are same then the MPIP control server with the largest IP address will be selected.
2. If no neighboring MPIP control server proposed itself as a Backup DMS ("BMDS") BDMS, the neighbor with the largest priority will be selected as BDMS. If the priorities are same then the MPIP control server with the largest IP address will be selected.
3. If no neighboring MPIP control server proposes itself as a DMS then the BDMS will be promoted to DMS.

A given MPIP control server cannot propose itself as both a DMS and a Backup DMS ("BDMS").

If a DMS goes out of service, a BDMS becomes the DMS and a new BDMS is chosen. After a new BDMS comes up to its FULL state, it will send a server update request to the DMS to get bundle and link information. If the highest-priority MPIP control server comes down, another is selected; this selection will remain even after the highest-priority MPIP control server comes up again. MPIP control servers with priority zero will never be selected.

If a BDMS goes down, a new BDMS is elected. After the new BDMS comes up to its FULL state, it will send a server update request to the designated MPIP control server to get bundle and link information.

As was discussed above, MPIP control server 80 can send IP multicast packets. MPIP control server 80 attaches an IP multicast packet to a UDP multicast send request message ("UDP_MCAST_SEND_REQ") and sends the message to UDP 130. UDP 130 will set up the UDP header for the packet, attach the packet to an IP forward transmission multicast packet message ("IP_FWD_TX_MCAST_PACKET"), and then pass the message to IP 132. Table 18 illustrates pseudo-code for a UDP multicast send request message data structure. However, other data structure layouts could also be used.

TABLE 18

```
#define UDP_MCAST_SEND_REQ
#define UDP_MCAST_SEND_RSP
typedef struct_udp_tx_mcast_pkt_
{
    struct udp_connudpc;
    net            *n;    //network
} UdpTxMcastPktMsg;
```

MPIP control server 80 can also join an IP multicast host group. MPIP control server 80 sends IP 132 an IP forward multicast join group request message ("IP_FWD_MCAST_JOIN_GRP_REQ") to request this host to become a member of host group identified by grp_addr on the given termination unit. Upon receiving the request, the IP 132 creates a multicast route, sends driver 138 a driver add multicast request message, then waits for driver 138 to respond. When the response comes back from driver 138, IP 132 sends MPIP control server 80 an IP forward multicast join group response message ("IP_FWD_MCAST_JOIN_GRP_RSP") with the message status set to the driver's 138 response message status. Table 19 illustrates pseudo-code for an IP forward join multicast group message data structure. However, other data structure layouts could also be used.

TABLE 19

```
#define IP_FWD_MCAST_JOIN_GRP_REQ
#define IP_FWD_MCAST_JOIN_GRP_RSP
typedef struct_ip_fwd_mcast_join_grp_
{
    Uint32    grp_addr;
    net       *n;
} IpFwdMcastJoinGrpMsg;
```

MPIP control server 80 can also leave an IP multicast group. MPIP control server 80 sends IP 132 an IP forward multicast leave group request message ("IP_FWD_MCAST_LEAVE_GRP_REQ") to request a host to give up the membership identified by grp_addr on a given termination unit. In turn, IP 132 will delete a multicast route, send driver 138 a driver delete multicast request message, then wait for driver 138 to respond. When the response comes back from driver 138, IP 132 sends MPIP control server 80 an IP forward multicast leave group response message ("IP_FWD_MCAST_LEAVE_GRP_RSP") to indicate the result of the request. Table 20 illustrates pseudo-code for an IP multicast leave group message data structure. However, other data structure layouts could also be used.

TABLE 20

```
#define IP_FWD_MCAST_LEAVE_GRP_REQ
#define IP_FWD_MCAST_LEAVE_GRP_RSP
typedef struct_ip_fwd_mcast_leave_grp_
{
    Uint32    grp_addr;
    net       *n;
} IpFwdMcastLeaveGrpMsg;
```

The sharing of bundle information between the termination units through a virtual data stream tunnel gives a great deal of flexibility in the design and type of termination units that may be employed. A virtual data stream tunnel can be created and used from multiple termination units. This allows a termination unit that is a bundle owner to collect and reconstruct data streams for a bundle and send them to a destination. The MPIP control server 80 and MPIP control client 92 can be used with a variety of tunneling protocols to create a flexible virtual data stream tunneling system.

It will be appreciated from the forgoing description of a presently illustrative embodiment of the invention that some variation in the above procedures are envisioned depending on the particular features of the data transmission medium, the capabilities of the termination units and the network linking the termination units. Such variations will apparent to those of skill in the art and are intended to be within the spirit and scope of the invention. This true spirit and scope is defined by the appended claims, to be interpreted in light of the foregoing specification.

We claim:

1. A method of coordinating the reconstruction of a plurality of data streams representing a session, the data streams generated by a source and transmitted to a destination over a plurality of links collectively forming a bundle, the data streams terminating at the destination at a first termination unit and at a second termination unit, the method comprising the steps of:

determining on the first termination unit that data streams for the bundle are terminating on the second termination unit;

requesting from the first termination unit that the second termination unit create a virtual data stream tunnel from the second termination unit to the first termination unit and send the data streams for the bundle through the virtual data stream tunnel;

collecting on the first termination unit the data streams from the virtual data stream tunnel and data streams terminating directly on the first termination unit; and reconstructing data streams for the bundle on the first termination unit and directing the data streams to the destination from the first termination unit.

2. A computer readable medium having storing therein instructions for causing a central processing unit on a termination unit to execute the method of claim 1.

3. The method of claim 1 wherein the determining step includes determining with a MPIP control server on the first termination unit that data streams for the bundle are terminating on the second termination unit.

4. The method of claim 1 wherein the step of requesting the second termination unit create a virtual data stream tunnel includes requesting a MPIP control client on the second termination unit create a virtual data stream tunnel.

5. The method of claim 1 wherein said first and second termination units comprise network access servers.

6. The method of claim 1 wherein the second termination unit sends data streams to the first termination unit through the virtual data stream tunnel with a virtual data stream tunneling protocol.

7. The method of claim 1 wherein the collecting step includes collecting the data streams from a virtual tunneling protocol used to send the data streams through the virtual data stream tunnel.

8. The method of claim 1 wherein the first termination unit and the second termination use a virtual data stream tunneling port to send and receive control information to establish the virtual data stream tunnel.

9. The method of claim 1 wherein the virtual data stream tunnel is a secure virtual data stream tunnel established with encrypted session keys.

10. A method of coordinating the reconstruction of a plurality of data streams representing a session, the data streams generated by a source and transmitted to a destination over a plurality of links collectively forming a bundle, the data streams terminating at said destination at a first termination unit and at a second termination unit, the method comprising the steps of:

receiving a request on the second termination unit to create a virtual data stream tunnel between the second termination unit and the first termination unit;

creating a virtual data stream tunnel between the second termination unit and the first termination unit from the second termination unit; and sending the data streams terminating at the second termination unit through the virtual data stream tunnel to the first termination unit using a virtual data stream tunneling protocol.

11. A computer readable medium having storing therein instructions for causing a central processing unit on a termination unit to execute the method of claim 10.

12. The method of claim 10 wherein the receiving step includes receiving a request on a MPIP control client on the second termination unit from a MPIP control server on the first termination to create a virtual data stream tunnel.

13. The method of claim 10 wherein the creating step includes creating a virtual data stream tunnel with a MPIP control client on the second termination unit.

14. The method of claim 10 wherein said first and second termination units comprise network access servers.

15. The method of claim 10 wherein the virtual data stream tunneling protocol is a data link layer tunneling protocol including any of Virtual-Tunneling Protocol, Level-2-Tunneling Protocol or Point-to-Point-Tunneling Protocol.

16. A method of coordinating the reconstruction of a plurality of data streams representing a session, the data streams generated by a source and transmitted to a destination over a plurality of links collectively forming a bundle, the data streams terminating at said destination at a first termination unit and at a second termination unit, the method comprising the steps of:

determining on a supervisory computer connected to the plurality of links that data streams for the bundle are terminating on the second termination unit, wherein the first termination unit is the bundle owner;

requesting from the supervisory computer that the second termination unit create a virtual data stream tunnel from the second termination unit to the first termination unit and send the data streams for the bundle through the virtual data stream tunnel;

collecting the data streams from the virtual data stream tunnel and data streams terminating directly on the first termination unit; and reconstructing the data streams on the first termination unit and directing the data streams to the destination from the first termination unit.

17. A computer readable medium having storing therein instructions for causing a central processing unit on a termination unit to execute the method of claim 16.

18. The method of claim 16 wherein the requesting step includes requesting from a MPIP control server on the supervisory computer that a MPIP control client on the second termination unit create the virtual data stream tunnel.

19. The method of claim 16 wherein the supervisory computer, first termination unit and the second termination use a virtual tunneling protocol port to send control information to establish the virtual data stream tunnel.

20. A system for coordinating the reconstruction of a plurality of data streams including a first data stream and a second data stream, the first and second data streams representing a session generated by a source and transmitted to a destination over a plurality of links collectively forming a bundle, the system comprising:

first termination unit with a MPIP control server and a MPIP control client for receiving said first data stream;

second termination unit with a MPIP control server and MPIP control client for receiving said second data stream;

communication medium connecting said first and second termination units;

designated termination unit selected from a termination unit with a MPIP control server for receiving and reconstructing the first and second data streams;

virtual data stream tunnel between the first and second termination units whose creation is initiated by the designated termination unit, whereby the designated termination unit receives a data stream through the virtual data stream tunnel from the termination unit which has a MPIP control client and reconstructs the first and second data streams for transmission to the destination.

21. The system of claim 20, wherein data streams are transmitted from said source to said destination over an ISDN line.

22. The system of claim 20, further comprising a supervisory unit controlling the transmission of said data streams to the designated termination unit and initiation of the creation of the virtual data stream tunnel.

23. The system of claim 20 wherein a designated one of the plurality of MPIP control servers and the MPIP control client are used to create the virtual data stream tunnel between the first and second termination units.

24. The system of claim 20 wherein data streams are sent through the virtual data stream tunnel with a virtual data stream tunneling protocol.

25. The system of claim 24 wherein the virtual data stream tunneling protocol is a data link layer tunneling protocol including any of Virtual-Tunneling Protocol, Level-2-Tunneling Protocol or Point-to-Point-Tunneling.

26. A method of coordinating the reconstruction of a plurality of data streams representing a session, the data streams generated by a source and transmitted to a destination over a plurality of links collectively forming a bundle, the data streams terminating at said destination at a first termination unit and at a second termination unit, the first termination unit having a MPIP control server and a MPIP control client and the second termination unit having a MPIP control server and a MPIP control client, the method comprising the steps of:
   determining from a MPIP control server on the first termination unit that data streams for the bundle are terminating on the second termination unit;
   requesting from the MPIP control server on the first termination unit that the MPIP control client on the second termination unit create a virtual data stream tunnel from the second termination unit to the first termination unit and send the data streams for the bundle through the virtual data stream tunnel;
   receiving the data streams from the second termination unit through the virtual data stream tunnel encoded in a virtual data stream tunneling protocol;
   collecting from the first termination unit the data streams from the virtual data stream tunneling protocol and data streams terminating directly on the first termination unit; and
   reconstructing data streams for the bundle on the first termination unit and directing the data streams to the destination from the first termination unit.

27. A computer readable medium having storing therein instructions for causing a central processing unit on a termination unit to execute the method of claim 26.

28. The method of claim 26, further comprising:
   designating a MPIP control server as a designated control server;
   designating another one of MPIP control servers as a backup control server;
   recording link and bundle owner information on the designated control server and on the backup control server;
   requesting from the designated control server that a MPIP control client on the second termination unit create a virtual data stream tunnel; and
   determining periodically if the designated control server is functioning, and if not,
      designating the backup control server as the designated control server; and
      designating another one of the MPIP control servers as the backup server.

29. A method of coordinating the reconstruction of a plurality of data streams representing a session, the data streams generated by a source and transmitted to a destination over a plurality of links collectively forming a bundle, the data streams terminating at said destination at a first termination unit and at a second termination unit, the method comprising the steps of:
   receiving a request on a MPIP control client on the second termination unit from a designated MPIP control server on a first termination unit to create a virtual data stream tunnel between the second termination unit and the first termination unit;
   creating a virtual data stream tunnel from the MPIP control client between the second termination unit and the first termination unit from the second termination unit; and
   sending the data streams terminating at the second termination unit through the virtual data stream tunnel to the first termination unit using a virtual data stream tunneling protocol.

30. A computer readable medium having storing therein instructions for causing a central processing unit on a termination unit to execute the method of claim 29.

* * * * *